(12) United States Patent
Gong et al.

(10) Patent No.: US 11,304,143 B2
(45) Date of Patent: Apr. 12, 2022

(54) TERMINAL DEVICE, NETWORK DEVICE, FRAME FORMAT CONFIGURATION METHOD, AND SYSTEM

(71) Applicant: HUAWEI TECHNOLOGIES CO., LTD., Guangdong (CN)

(72) Inventors: Zhengwei Gong, Shanghai (CN); Xiaojun Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 16/115,267

(22) Filed: Aug. 28, 2018

(65) Prior Publication Data
US 2018/0368074 A1    Dec. 20, 2018

(30) Foreign Application Priority Data
Feb. 29, 2016    (CN) .................... 201610113290.X

(51) Int. Cl.
*H04W 52/02* (2009.01)
*H04B 7/26* (2006.01)
(Continued)

(52) U.S. Cl.
CPC .......... *H04W 52/0274* (2013.01); *H04B 7/26* (2013.01); *H04L 5/0092* (2013.01);
(Continued)

(58) Field of Classification Search
CPC .. H04L 5/14; H04W 52/027; H04W 52/0274; H04W 72/0446
See application file for complete search history.

(56) References Cited

U.S. PATENT DOCUMENTS 9,781,002 B2 * 10/2017 Seo ..................... H04L 41/0816
9,872,287 B2 *  1/2018 Golitschek Edler von Elbwart ... H04L 5/0048
(Continued)

FOREIGN PATENT DOCUMENTS

CN    101888288 A    11/2010
CN    101990141 A     3/2011
(Continued)

OTHER PUBLICATIONS

Indian Examination Report issued in corresponding Indian Application No. 201847033543, dated Sep. 1, 2020, The Patent Office, Intellectual Property India, Chennai, India.

*Primary Examiner* — Redentor Pasia
(74) *Attorney, Agent, or Firm* — Hauptman Ham, LLP

(57) ABSTRACT

This disclosure disclose a terminal control method and a terminal. The method may include: when detecting that the front-facing camera is in a low power consumption mode, sending, by the second processor, a first message to the first processor, where the first message indicates that the front-facing camera is in the low power consumption mode; after receiving the first message, controlling, by the first processor, the front-facing camera to collect a low-power-consumption-mode image in the low power consumption mode; receiving, by the first processor, the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting, by the first processor, brightness of a screen of the terminal according to an identification result.

20 Claims, 5 Drawing Sheets

(51) Int. Cl.
 *H04L 5/00* (2006.01)
 *H04L 5/14* (2006.01)
 *H04W 72/04* (2009.01)
 *H04L 1/18* (2006.01)

(52) U.S. Cl.
 CPC ............... *H04L 5/14* (2013.01); *H04W 52/02* (2013.01); *H04W 52/027* (2013.01); *H04W 72/0446* (2013.01); *H04L 1/1812* (2013.01); *H04L 1/1887* (2013.01); *H04L 5/1469* (2013.01)

(56) References Cited

U.S. PATENT DOCUMENTS

| | | | |
|---|---|---|---|
| 10,154,499 B2* | 12/2018 | Lee | H04W 72/0486 |
| 2012/0163246 A1 | 6/2012 | Wang et al. | |
| 2013/0281022 A1 | 10/2013 | Mahany et al. | |
| 2014/0328283 A1 | 11/2014 | Wan et al. | |
| 2015/0029912 A1* | 1/2015 | Park | H04L 5/0055 370/280 |
| 2015/0312905 A1* | 10/2015 | Seo | H04B 7/2656 370/280 |
| 2016/0156455 A1* | 6/2016 | Park | H04L 1/1861 370/280 |
| 2016/0315754 A1* | 10/2016 | Wu | H04L 25/0228 |
| 2017/0019218 A1* | 1/2017 | Sadeghi | H04W 72/042 |
| 2017/0026073 A1* | 1/2017 | Liu | H04L 5/0096 |
| 2017/0048741 A1* | 2/2017 | Lee | H04L 41/08 |
| 2017/0170944 A1* | 6/2017 | Ang | H04L 1/1812 |
| 2017/0201990 A1* | 7/2017 | Wang | H04W 72/04 |
| 2018/0054743 A1* | 2/2018 | Lee | H04W 16/26 |
| 2018/0227906 A1* | 8/2018 | Yang | H04W 74/00 |

FOREIGN PATENT DOCUMENTS

| | | |
|---|---|---|
| CN | 103220723 A | 7/2013 |
| CN | 103781181 A | 5/2014 |
| CN | 103974434 A | 8/2014 |
| EP | 2797355 A1 | 10/2014 |
| WO | 2009051358 A2 | 4/2009 |
| WO | 2015135178 A1 | 9/2015 |
| WO | 2015154223 A1 | 10/2015 |

* cited by examiner

TERMINAL DEVICE, NETWORK DEVICE, FRAME FORMAT CONFIGURATION METHOD, AND SYSTEM

CROSS-REFERENCE TO RELATED APPLICATIONS

This application is a continuation of International Application No. PCT/CN2017/072099, filed on Jan. 22, 2017, which claims priority to Chinese Patent Application No. 201610066615.3, filed on Jan. 29, 2016. The disclosures of the aforementioned applications are hereby incorporated by reference in their entireties.

TECHNICAL FIELD

The present disclosure relates to the field of terminal technologies, and in particular, to a terminal control method and a terminal.

BACKGROUND

With rapid popularization of intelligent terminals, more people make or receive calls, send or receive SMS messages, surf the Internet, and use various application services by using intelligent terminals such as smartphones or tablet computers, so that the intelligent terminals become an indispensable part of people's life.

In the prior art, usually an intelligent terminal can work normally only when a processor is in a waking state. For example, when a mobile phone is in a standby state, the processor is in a sleep mode and a screen is in an off state. When a user needs to use the intelligent terminal, the user needs to press a power key or enter a related gesture to wake up the sleeping processor, so as to light up the screen of the terminal. This is complex and inconvenient for the user, and an intelligence effect is poor. In addition, some applications on the intelligent terminal are also restricted by the processor. For example, in the standby state, after the processor enters the sleep mode, a camera cannot work. To ensure that an application using the camera can work normally at any time, the user needs to keep the processor of the intelligent terminal in the waking state. This not only increases power consumption of the intelligent terminal but also greatly affects a battery life of the intelligent terminal.

SUMMARY

To resolve a technical problem, embodiments of the present disclosure provide a terminal control method and a terminal. According to the present disclosure, a prior-art technical problem that both intelligence and low power consumption of a terminal cannot be ensured can be resolved, so that user experience is improved.

According to a first aspect, an embodiment of the present disclosure provides a terminal control method, applied to a terminal including a first processor, a second processor, and a front-facing camera, where an operation processing capability of the first processor is lower than an operation processing capability of the second processor, and the method may include:

when detecting that the front-facing camera is in a low power consumption mode, sending, by the second processor, a first message to the first processor, where the first message indicates that the front-facing camera is in the low power consumption mode;

after receiving the first message, controlling, by the first processor, the front-facing camera to collect a low-power-consumption-mode image in the low power consumption mode;

receiving, by the first processor, the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting, by the first processor, brightness of a screen of the terminal according to an identification result.

According to the solution provided in this embodiment of the present disclosure, the first processor may intelligently and automatically adjust the brightness of the screen of the terminal according to the identification result of the image collected by the camera, without requiring the user to perform a manual operation. In addition, the first processor with relatively low power consumption controls the camera to collect the low-power-consumption-mode image, performs identification, and finally, directly controls or controls, by means of triggering, the brightness of the screen of the terminal, so that the second processor with relatively high power consumption is prevented from excessively participating in processes of image identification and intelligent control over the terminal, and power consumption of the terminal is reduced.

In one embodiment, the adjusting, by the first processor, brightness of a screen of the terminal according to an identification result includes:

calculating, by the first processor, a current ambient brightness value according to the low-power-consumption-mode image; and when the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an on state, adjusting, by the first processor, the brightness of the screen of the terminal according to the ambient brightness value, where a larger ambient brightness value indicates higher adjusted brightness of the screen of the terminal.

According to the solution provided in this embodiment of the present disclosure, both intelligence and low power consumption of the terminal are ensured. In addition, the current ambient brightness value may be calculated according to the low-power-consumption-mode image, and the brightness of the screen of the terminal is adjusted intelligently, so that experience is improved when the user uses the terminal.

In one embodiment, the adjusting, by the first processor, brightness of a screen of the terminal according to an identification result includes:

controlling, by the first processor, the second processor to adjust the brightness of the screen of the terminal according to the identification result.

According to the solution provided in this embodiment of the present disclosure, the first processor instructs, by means of triggering, the second processor to adjust the brightness of the screen of the terminal according to the identification result. The first processor with low power consumption is used to perform identification and triggering actions, so as to ensure intelligence of the terminal and reduce power consumption, thereby improving user experience.

In one embodiment, the controlling, by the first processor, the second processor to adjust the brightness of the screen of the terminal according to the identification result includes:

when the first processor receives the low-power-consumption-mode image and identifies that there are a predetermined quantity of consecutive low-power-consumption-mode images that include the preset characteristic information, and the first processor detects that the second processor is in a sleep mode, waking up, by the first processor, the second processor and instructing the second processor to light up the screen of the terminal.

According to the solution provided in this embodiment of the present disclosure, when the first processor identifies that the user currently needs to use the terminal, and detects that the second processor is in the sleep mode, the first processor wakes up the second processor and instructs the second processor to light up the screen of the terminal, so as to intelligently meet a requirement of the user without a manual operation of the user, thereby improving user experience.

In one embodiment, the controlling, by the first processor, the second processor to adjust the brightness of the screen of the terminal according to the identification result includes:

when the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an off state, instructing, by the first processor, the second processor to light up the screen of the terminal.

According to the solution provided in this embodiment of the present disclosure, when the first processor identifies that the user currently needs to use the terminal, and detects that the second processor is in the waking state and the screen is in the off state, the first processor instructs the second processor to light up the screen of the terminal, so as to intelligently meet a requirement of the user without a manual operation of the user, thereby improving user experience.

In one embodiment, the controlling, by the first processor, the second processor to adjust the brightness of the screen of the terminal according to the identification result includes:

when the first processor receives the low-power-consumption-mode image and identifies that no predetermined quantity of consecutive low-power-consumption-mode images include the preset characteristic information, and the first processor detects that the screen of the terminal is in an on state, instructing, by the first processor, the second processor to turn off the screen of the terminal.

According to the solution provided in this embodiment of the present disclosure, when identifying that the user currently does not need to use the terminal, and detecting that the screen is in the on state, the first processor instructs the second processor to turn off the screen of the terminal, so as to reduce power consumption of the terminal.

In one embodiment, the method further includes:

calculating, by the first processor, a current ambient brightness value according to the low-power-consumption-mode image; and the instructing, by the first processor, the second processor to light up the screen of the terminal includes:

sending, by the first processor, the ambient brightness value to the second processor, and adjusting, by the second processor, the brightness of the screen of the terminal according to the ambient brightness value, where a larger ambient brightness value indicates higher adjusted brightness of the screen of the terminal.

According to the solution provided in this embodiment of the present disclosure, both intelligence and low power consumption of the terminal are ensured. In addition, the current ambient brightness value may be calculated according to the low-power-consumption-mode image, so that the brightness of the screen of the terminal is intelligently adjusted, and experience is further improved when the user uses the terminal.

In one embodiment, the method further includes:

when detecting that the front-facing camera switches from the low power consumption mode to a non-low power consumption mode, sending, by the second processor, a second message to the first processor, where the second message indicates that the front-facing camera switches to the non-low power consumption mode; and after receiving the second message, stopping, by the first processor, controlling the front-facing camera, controlling, by the second processor, the front-facing camera to collect a non-low-power-consumption-mode image in the non-low power consumption mode, and performing, by the second processor, subsequent processing on the non-low-power-consumption-mode image.

According to the solution provided in this embodiment of the present disclosure, after detecting that a normal photographing function of the front-facing camera is enabled, the second processor controls the front-facing camera to collect and output the non-low-power-consumption-mode image with a frame rate or resolution higher than that of the low-power-consumption-mode image, so that the user can achieve a normal photographing effect when the user needs to use the photographing function of the front-facing camera. This not only implements a function of identifying the preset characteristic information by using the front-facing camera, but also retains and ensures a basic function of the front-facing camera serving as a camera sensor. In this way, both intelligence and low power consumption of the terminal are further ensured, and user experience is further improved.

In one embodiment, the first processor is a coprocessor, and the second processor is an application processor.

According to a second aspect, an embodiment of the present disclosure provides a terminal, which may include a first processor, a second processor, a front-facing camera, and a storage unit, where an operation processing capability of the first processor is lower than an operation processing capability of the second processor, the storage unit is configured to store program code, and the second processor is configured to invoke the program code stored by the storage unit, to perform the following step: when it is detected that the front-facing camera is in a low power consumption mode, sending a first message to the first processor, where the first message indicates that the front-facing camera is in the low power consumption mode; and the first processor is configured to invoke the program code stored by the storage unit, to perform the following steps: after the first message is received, controlling the front-facing camera to collect a low-power-consumption-mode image in the low power consumption mode; receiving the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting brightness of a screen of the terminal according to an identification result.

In one embodiment, the first processor is configured to:

calculate a current ambient brightness value according to the low-power-consumption-mode image; and when receiving the low-power-consumption-mode image and identifying that there are a predetermined quantity of consecutive low-power-consumption-mode images that include the preset characteristic information, and detecting that the second processor is in a waking state and the screen of the terminal is in an on state, adjust the brightness of the screen of the terminal according to the ambient brightness value, where a larger ambient brightness value indicates higher adjusted brightness of the screen of the terminal.

In one embodiment, the first processor is configured to:

control, by the first processor, the second processor to adjust the brightness of the screen of the terminal according to the identification result.

In one embodiment, the first processor is configured to:

when receiving the low-power-consumption-mode image and identifying that there are a predetermined quantity of consecutive low-power-consumption-mode images that include the preset characteristic information, and detecting that the second processor is in a sleep mode, wake up, by the first processor, the second processor and instruct the second processor to light up the screen of the terminal.

In one embodiment, the first processor is configured to:

when receiving the low-power-consumption-mode image and identifying that there are a predetermined quantity of consecutive low-power-consumption-mode images that include the preset characteristic information, and detecting that the second processor is in a waking state and the screen of the terminal is in an off state, instruct, by the first processor, the second processor to light up the screen of the terminal.

In one embodiment, the first processor is configured to:

when receiving the low-power-consumption-mode image and identifying that no predetermined quantity of consecutive low-power-consumption-mode images include the preset characteristic information, and detecting that the screen of the terminal is in an on state, instruct the second processor to turn off the screen of the terminal.

In one embodiment, the first processor is further configured to calculate a current ambient brightness value according to the low-power-consumption-mode image;

the first processor is specifically configured to send the ambient brightness value to the second processor; and the second processor is specifically configured to adjust the brightness of the screen of the terminal according to the ambient brightness value, where a larger ambient brightness value indicates higher adjusted brightness of the screen of the terminal.

In one embodiment, the second processor is further configured to: when detecting that the front-facing camera switches from the low power consumption mode to a non-low power consumption mode, send a second message to the first processor, where the second message indicates that the front-facing camera switches to the non-low power consumption mode;

the first processor is further configured to: after receiving the second message, stop controlling the front-facing camera; and the second processor is further configured to: control the front-facing camera to collect a non-low-power-consumption-mode image in the non-low power consumption mode, and perform subsequent processing on the non-low-power-consumption-mode image.

In one embodiment, the first processor is a coprocessor, and the second processor is an application processor.

Implementation of the embodiments of present disclosure brings the following beneficial effects:

In the embodiments of the present disclosure, in the terminal including the first processor, the second processor, and the front-facing camera, the first processor with relatively low power consumption can control the front-facing camera to collect the low-power-consumption-mode image in the low power consumption mode, then, receive the low-power-consumption-mode image and identify whether there are a predetermined quantity of consecutive low-power-consumption-mode images that include the preset characteristic information, and finally, adjust the brightness of the screen of the terminal according to the identification result. Therefore, the processor may intelligently and automatically adjust the brightness of the screen of the terminal, without requiring the user to perform a manual operation. In addition, in this implementation, the first processor with relatively low power consumption controls the front-facing camera to collect the low-power-consumption-mode image, performs identification, and finally, adjusts the brightness of the screen of the terminal, so that the second processor with relatively high power consumption is prevented from excessively participating in brightness adjustment to the screen of the terminal, power consumption of the terminal is reduced, and a battery life is prolonged. That is, both intelligence and the battery life of the terminal can be ensured, great convenience is provided for the user during use of the terminal, and user experience is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following describes the embodiments of the present disclosure with reference to the accompanying drawings in the embodiments of the present disclosure.

Figure 1:
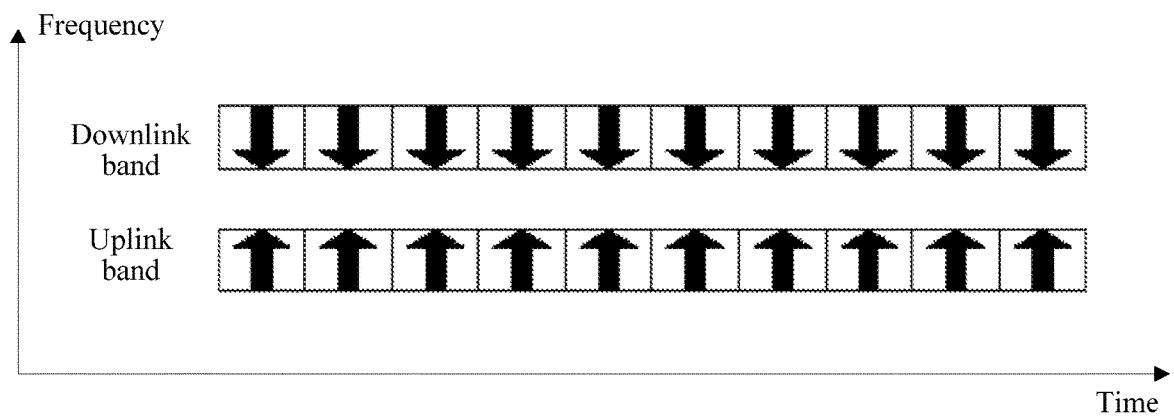
FIG. 1 is a schematic structural diagram of a terminal according to an embodiment of the present disclosure.

It should be noted that, a terminal control method in the present disclosure is applied to a terminal including a first processor, a second processor, and a front-facing camera. As shown in FIG. 1, FIG. 1 is a schematic structural diagram of a terminal according to an embodiment of the present disclosure. A first processor 101 and a second processor 102 each are connected to a front-facing camera 103 by using a front-facing camera interface. The first processor 101, the second processor 102, and a screen 1061 are electrically connected to each other. In actual application, the second processor 102 in this embodiment of the present disclosure may be an application processor (which may be integrated by an image information processor or include an image information processing unit), and serve as a main processor, of the terminal, that is responsible for display on the screen 1061, playing of a video and audio, various applications, a voice call, data transmission, and the like. When a user presses a power key to start the terminal, the second processor 102 starts and runs, so that the terminal can be normally used. When the user turns off the power key, to reduce power consumption of the second processor 102, the second processor 102 enters a sleep mode, and in addition, in this embodiment of the present disclosure, only the first processor 101 with relatively low power consumption can work normally. Specifically, the first processor 101 is an auxiliary operation chip, and may be a coprocessor or an auxiliary processor, configured to: reduce load of an application processor in the terminal, and execute a preset processing task, for example, process image or video data, or sense and measure motion data, so as to reduce load of a main processor and then prolong a standby time. In this embodiment of the present disclosure, the coprocessor may receive and identify a low-power-consumption-mode image with relatively low power consumption at any time. It may be understood that, only an example description is provided herein. According to different specific terminal types, actually both the first processor 101 and the second processor 102 may be processors of an ARM architecture or an X86 architecture, or processors of another architecture. Further, the first processor 101 and the second processor 102 may be processing units, with different performance and functions, integrated into a same processor component. That is, this embodiment of the present disclosure imposes no specific limit on a combination of different types of processors.

It should be further noted that, the terminal in this embodiment of the present disclosure includes but is not limited to user equipment that includes the first processor 101, the second processor 102, the front-facing camera 103, and the screen 1061, such as a smartphone, a tablet computer, a media player, a smart TV, a smart band, a smart wearable device, an MP3 (Moving Picture Experts Group Audio Layer III, Moving Picture Experts Group Audio Layer III) player, an MP4 (Moving Picture Experts Group Audio Layer IV, Moving Picture Experts Group Audio Layer III) player, a personal digital assistant (Personal Digital Assistant, PDA), and a laptop portable computer.

Referring to FIG. 1, FIG. 1 is a schematic flowchart of a terminal control method according to an embodiment of the present disclosure. The following describes the terminal control method in this embodiment of the present disclosure in detail with reference to FIG. 1 from a perspective of interaction between a first processor and a second processor in a terminal.

Operation S201: When detecting that the front-facing camera is in a low power consumption mode, the second processor sends a first message to the first processor.

Specifically, the low power consumption mode in the present disclosure is a mode in which a normal photographing function of the front-facing camera is not enabled, that is, in this case, a user does not make the front-facing camera enter a normal photographing mode by using a related photographing application. A non-low power consumption mode is a mode in which the user enables the normal photographing function of the front-facing camera by using a related photographing application. It may be understood that, when the terminal switches from a power-off state to a power-on state, apparently, the front-facing camera is still in the low power consumption mode (because the normal photographing function of the camera may be enabled only after the terminal is powered on). Therefore, when the second processor detects that the terminal switches from the power-off state to the power-on state, and learns that the front-facing camera is in the low power consumption mode, or when the second processor detects that the front-facing camera exits from the non-low power consumption mode (the normal photographing mode is enabled) and enters the low power consumption mode (the normal photographing mode is not enabled), the second processor sends, to the first processor, the first message indicating that the front-facing camera is in the low power consumption mode. It may be further understood that, the first processor and the second processor may start at the same time when the terminal switches from the power-off state to the power-on state, or the first processor may start when the second processor sends the first message to the first processor.

Operation S202: After receiving the first message, the first processor controls the front-facing camera to collect a low-power-consumption-mode image in the low power consumption mode.

Specifically, in this embodiment of the present disclosure, after the terminal is powered on, both the first processor (for example, a coprocessor) and the second processor (for example, an application processor) are connected to the front-facing camera. In addition, an operation processing capability of the first processor is lower than that of the second processor, and power consumption of the first processor is usually lower than that of the second processor accordingly. Therefore, in a mode in which the normal photographing function of the front-facing camera of the terminal is not enabled, only the coprocessor receives the low-power-consumption-mode image output by the front-facing camera, so that the coprocessor determines, according to the received low-power-consumption-mode image, whether the image includes preset characteristic information such as human eye gaze characteristic information or facial characteristic information, to determine whether brightness of a screen of the terminal needs to be adjusted. In addition, the low-power-consumption-mode image (for example, an image with a low frame rate or low resolution) is used to minimize power consumption when the coprocessor keeps receiving the low-power-consumption-mode image output by the front-facing camera. The coprocessor receives the low-power-consumption-mode image, so as to determine, according to the low-power-consumption-mode image, whether the user currently gazes at the screen of the terminal or needs to use the terminal. Therefore, an image with higher definition or an image with a higher frame rate is not required, provided that it can be determined whether the preset characteristic information is included. This can avoid a waste of image resources and then avoid a waste of system power consumption.

Further, when the user needs to enable the photographing function of the front-facing camera, the application processor may receive a non-low-power-consumption-mode image (for example, an image with a high frame rate or high resolution) output by the front-facing camera in a mode in which the photographing function is enabled, so that the user can photograph a high-definition image. In this way, both intelligence of the terminal and a basic photographing function of the front-facing camera can be ensured.

Operation S203: The first processor receives the low-power-consumption-mode image and identifies whether there are a predetermined quantity of consecutive low-power-consumption-mode images that include preset characteristic information.

Specifically, the first processor identifies whether each frame of low-power-consumption-mode image includes the preset characteristic information. The preset characteristic information is characteristic information indicating that the user currently needs to use the terminal, and may be biological characteristic information such as human eye gaze information, infrared information, iris information, or facial recognition information. That is, the preset characteristic information may be used as a determining basis for determining whether the user is using or needs to use the terminal. Further, it can not only be determined whether the low-power-consumption-mode image includes the preset characteristic information, but also be determined whether current preset characteristic information belongs to the user of the terminal. For example, facial recognition of a preset user, human eye information recognition of a preset user, or the like may be performed. That is, when it is identified whether the user is currently using the terminal, it may also be checked whether the user is an authorized user, so that an unauthorized user is prevented from operating the mobile phone. This ensures both intelligence of the terminal and security of the terminal.

Further, in a process of identifying the preset characteristic information, an error may exist, and consequently, a determining result is inaccurate. Therefore, a predetermined quantity of low-power-consumption-mode images need to be consecutively identified. For example, when it is consecutively identified that five frames of low-power-consumption-mode images include human eye information, it may be considered that the user is currently using the terminal. In this way, the preset characteristic information is used as a determining basis for adjusting the brightness of the screen of the terminal.

Operation S204: The first processor adjusts brightness of a screen of the terminal according to an identification result.

Specifically, the first processor adjusts the brightness of the screen of the terminal according to the identification result. More specifically, the following may be included: The first processor controls the brightness of the screen of the terminal, or the first processor instructs the second processor to adjust the brightness of the screen of the terminal. A principle is that, when the coprocessor with relatively lower power consumption may be used to adjust and control the terminal, the coprocessor is preferentially used to adjust and control the terminal; and when the application processor with a strong operation processing capability or relatively high power consumption is required to implement control, it is necessary to use the second processor to control the terminal. The brightness of the screen may be adjusted by lighting up or turning off the screen of the terminal, adjusting the brightness, or the like. For example, when it is identified that the low-power-consumption-mode image has the preset characteristic information (for example, the human eye information), the sleeping application processor or another sleeping processor may be woken up, and the application processor that has been woken up is instructed to light up the off screen, so that when the user needs to use the terminal, a related processor in the terminal is in a waking state and the screen is in an on state. This facilitates use of the user.

It should be emphasized that, in the prior art, screen display of the terminal generally includes two functions: content display on the screen and backlight adjustment. Content that needs to be displayed on the screen is provided and transferred to the screen by the application processor, and is in the charge of an LCD driver. A backlight driver is responsible for lighting up and turning off backlight and adjusting brightness of the backlight. Although the two functions are implemented by using different software drivers, the application processor is essentially responsible for implementing both the functions. In addition, the two functions are usually associated from a perspective of a user. For example, content is loaded and displayed only when the backlight is on; and if the backlight is off, there is no need to display content, because if content is displayed on the screen but the backlight is off, or the backlight is on but no content is displayed, the user cannot use the terminal normally. Therefore, that the screen is in the on state mentioned in this embodiment of the present disclosure essentially means that to-be-displayed content is loaded onto the screen and the backlight is on; and that the screen is in an off state mentioned in the present disclosure essentially means that no to-be-displayed content is loaded onto the screen and the backlight is off.

However, in this embodiment of the present disclosure, the coprocessor is added, and the coprocessor may also control the backlight driver to light up and turn off the backlight and adjust the brightness of the backlight. Therefore, in this embodiment of the present disclosure, for the following reason, the application processor needs to implement the two functions (content display and backlight adjustment) only when the photographing function of the front-facing camera is enabled: When the photographing function is enabled, the backlight is definitely in an on state. Therefore, only the brightness of the backlight needs to be adjusted. In the present disclosure, a current ambient brightness value is calculated according to an image output by the front-facing camera, and then, the backlight is adjusted according to the brightness value. Therefore, in this case, only the application processor that is receiving a non-low-power-consumption-mode image can be used to adjust the backlight. In other scenarios in this embodiment of the present disclosure, it may be that only the application processor is responsible for loading content to be displayed on the screen, and the coprocessor directly lights up or turns off the backlight or adjusts the brightness of the backlight.

Further, in the foregoing embodiment, that "the first processor adjusts brightness of a screen of the terminal according to an identification result" in step S204 may be implemented in either of the following implementations:

Implementation 1: The first processor calculates a current ambient brightness value according to the low-power-consumption-mode image. When the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an on state, the first processor adjusts the brightness of the screen of the terminal according to the ambient brightness value. A larger ambient brightness value indicates higher adjusted brightness of the screen of the terminal.

Specifically, the first processor may calculate the current ambient brightness value according to the low-power-consumption-mode image received in operation S203. For example, the ambient brightness value is estimated by calculating a brightness value of the low-power-consumption-mode image. Image brightness essentially depends on brightness of each pixel in the image, and the brightness of each pixel essentially depends on a size of an RGB value. When an RGB value is 0, a pixel is black, and when an RGB value is 255, a pixel is the brightest and the pixel is white. Therefore, an average brightness value of all the pixels in the low-power-consumption-mode image may be obtained by calculating an RGB value of each pixel in the low-power-consumption-mode image, and then, the current ambient brightness value is estimated with reference to a preset calculation formula according to the average brightness value of the low-power-consumption-mode image. Optionally, adjustment may be performed according to a preset brightness value, of the screen of the terminal, that is corresponding to a preset image brightness value. The present disclosure imposes no specific limit on a specific manner of calculating the current ambient brightness value. It may be understood that, this method step may be performed without requiring the terminal to include a light sensor. That is, instead of additionally using the light sensor to measure and calculate the current ambient brightness value, the current ambient brightness value is directly obtained by using a pixel brightness value of the low-power-consumption-mode image. This further reduces power consumption of the terminal. When the first processor receives the low-power-consumption-mode image and identifies that there are a predetermined quantity of consecutive low-power-consumption-mode images that include the preset characteristic information (that is, determines that the user currently needs to use the terminal), and the first processor detects that the second processor is in the waking state and the screen of the terminal is in the on state, the first processor directly adjusts the brightness of the screen of the terminal according to the calculated ambient brightness value. An adjustment principle is that a larger ambient brightness value indicates higher adjusted brightness of the screen of the terminal. It should be noted that, when the screen of the terminal is on, it necessarily indicates that loading of content that needs to be displayed on the screen is completed. Therefore, in this method step, the first processor may directly adjust the brightness of the screen of the terminal. Certainly, it may be understood that the first processor may instruct the second processor to adjust the brightness of the screen of the terminal. This is not specifically limited in the present disclosure.

Implementation 2: The first processor controls the second processor to adjust the brightness of the screen of the terminal according to the identification result. Specifically, the implementation 2 may be implemented in any one of the following specific implementations:

Specific implementation 1: When the first processor receives the low-power-consumption-mode image and identifies that there are a predetermined quantity of consecutive low-power-consumption-mode images that include the preset characteristic information, and the first processor detects that the second processor is in a sleep mode, the first processor wakes up the second processor and instructs the second processor to light up the screen of the terminal.

Specifically, when it is determined, according to the low-power-consumption-mode image received in step S203, that the user needs to use the terminal, and it is detected that the second processor is in the sleep mode, before adjusting the brightness of the screen of the terminal, the first processor needs to wake up the second processor and instruct the second processor to light up the screen of the terminal, because the screen of the terminal is definitely in an off state when the second processor is in the sleep mode. Further, the first processor notifies the second processor of a calculated ambient brightness value, so that the second processor can not only light up the screen, but also appropriately adjust the brightness of the screen of the terminal according to the ambient brightness value. This further improves user experience. It should be noted that, when the application processor is in the sleep mode, the screen of the terminal is definitely in the off state, because the processor may be sleeping on the premise that the screen of the terminal is definitely in the off state. On the contrary, when the application processor is in a waking state, the screen of the terminal is not necessarily in the on state, for example, in a case in which a background application runs and no operation is performed in the foreground in a specific time.

Specific implementation 2: When the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an off state, the first processor instructs the second processor to light up the screen of the terminal.

Specifically, when it is determined, according to the low-power-consumption-mode image received in operation S203, that the user needs to use the terminal, and it is detected that the second processor is in the waking state and the screen of the terminal is in the off state, the second processor is instructed to light up the screen of the terminal, and the second processor is notified of a calculated ambient brightness value. For example, when the user is listening to music or is being on a call, to reduce power consumption, the screen enters the off state after a specific time. However, a related music application or a related call application runs in the background in this case, and therefore, the second processor (the application processor) is actually still in the waking state. In this case, the first processor only needs to instruct the second processor to light up the screen of the terminal. Further, the second processor may adjust the brightness of the screen of the terminal with reference to the calculated ambient brightness value.

Specific implementation 3: When the first processor receives the low-power-consumption-mode image and identifies that no predetermined quantity of consecutive low-power-consumption-mode images include the preset characteristic information, and the first processor detects that the screen of the terminal is in an on state, the first processor instructs the second processor to turn off the screen of the terminal.

Specifically, when it is determined, according to the low-power-consumption-mode image received in step S203, that the user does not need to use the terminal temporarily, the first processor instructs the second processor to turn off the screen of the terminal, so that power consumption is further reduced. It should be understood that, a reason that there is no need to instruct the second processor to sleep is that switching of the second processor (for example, the application processor) from a sleep mode to a waking state may be triggered or instructed by using an external element (a physical key, a preset gesture, or the first processor). However, switching of the application processor from the waking state to the sleep mode can be controlled only by the application processor, because only the application processor can learn whether a background application still runs currently, so as to determine whether the application processor needs to be in the waking state. Therefore, only the application processor can determine whether the application processor can switch from the waking state to the sleep mode Therefore, in this method step, when it is detected that no user needs to use the terminal, the first processor can control only turning off of the screen of the terminal, but cannot control the second processor to sleep (as described above, only the second processor can perform such control). Therefore, herein, the first processor only needs to instruct the second processor to adjust the brightness of the screen of the terminal.

It should be noted that, in all of the specific implementation 1, the specific implementation 2, and the specific implementation 3 in this embodiment of the present disclosure, the first processor (the coprocessor) instructs the second processor (the application processor) to adjust the brightness of the screen, because this can ensure synchronization between content display on the screen and lighting up of the backlight (including brightness adjustment) (in this case, if content display on the screen and lighting up of the backlight are triggered by using different processors, possibly, synchronization cannot be ensured, and therefore, user experience is poor). However, in the implementation 1, the coprocessor adjusts the brightness of the screen for the following reason: The application processor in the terminal is in the waking state and the screen is in the on state in this case, and therefore, only backlight brightness needs to be adjusted. Therefore, the coprocessor that receives the image and calculates the current ambient brightness value may be directly used to perform adjustment (because a problem of synchronization between content display and lighting up of the backlight does not exist). Although this embodiment of the present disclosure provides a preferred implementation, the present disclosure still includes and covers all implementations, in a scenario other than a scenario in which the photographing function of the front-facing camera is enabled, in which only the application processor is responsible for loading content to be displayed on the screen and the coprocessor directly lights up or turns off the backlight or adjusts the brightness of the backlight. All actual specific cases are not listed one by one herein.

In this embodiment of the present disclosure, in the terminal including the first processor, the second processor, and the front-facing camera, the first processor with relatively low power consumption can control the front-facing camera to collect the low-power-consumption-mode image in the low power consumption mode, then, receive the low-power-consumption-mode image and identify whether there are a predetermined quantity of consecutive low-power-consumption-mode images that include the preset characteristic information, and finally, adjust the brightness of the screen of the terminal according to the identification result. Therefore, the processor may intelligently and automatically adjust the brightness of the screen of the terminal, without requiring the user to perform a manual operation. In addition, in this implementation, the first processor with relatively low power consumption controls the front-facing camera to collect the low-power-consumption-mode image, performs identification, and finally, adjusts the brightness of the screen of the terminal, so that the second processor with relatively high power consumption is prevented from excessively participating in brightness adjustment to the screen of the terminal, power consumption of the terminal is reduced, and a battery life is prolonged. That is, both intelligence and the battery life of the terminal can be ensured, great convenience is provided for the user during use of the terminal, and user experience is improved.

Figure 3:
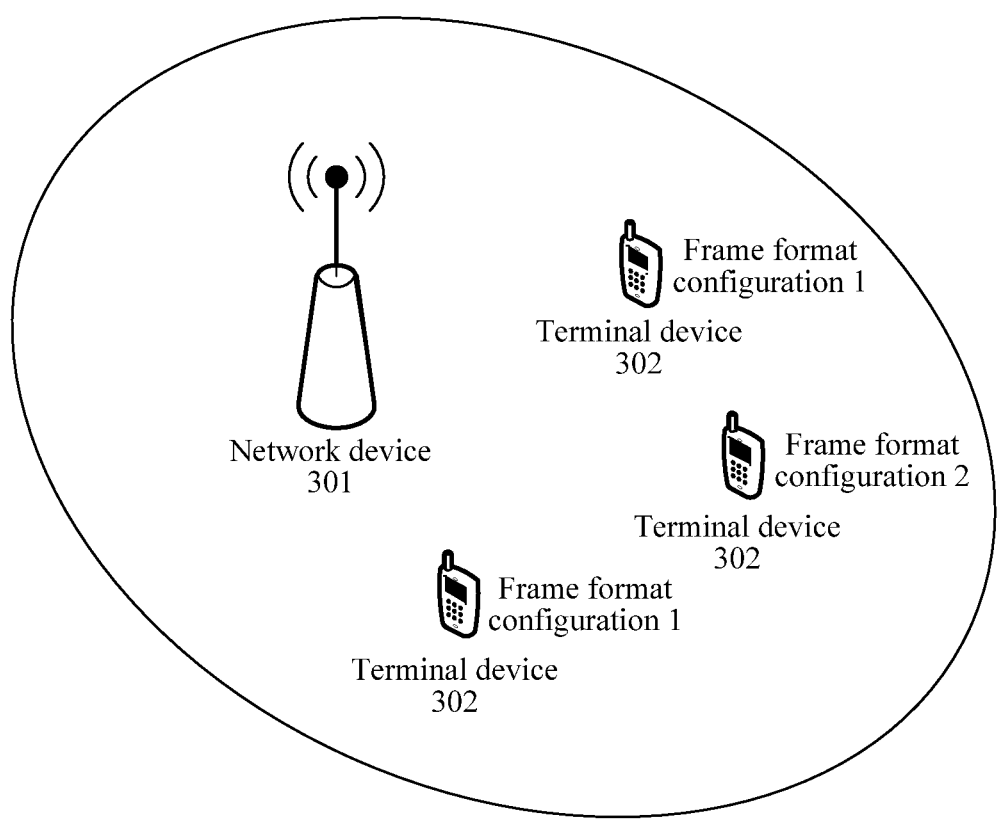
FIG. 3 is a schematic flowchart of another terminal control method according to an embodiment of the present disclosure.

Referring to FIG. 3, FIG. 3 is a schematic flowchart of another terminal control method according to an embodiment of the present disclosure. The following describes the terminal control method in this embodiment of the present disclosure in detail with reference to FIG. 3 from a perspective of interaction between a first processor and a second processor in a terminal.

Operation S301: When detecting that the front-facing camera is in a low power consumption mode, the second processor sends a first message to the first processor, where the first message indicates that the front-facing camera is in the low power consumption mode.

Operation S302: After receiving the first message, the first processor controls the front-facing camera to collect a low-power-consumption-mode image in the low power consumption mode.

Operation S303: The first processor receives the low-power-consumption-mode image and identifies whether there are a predetermined quantity of consecutive low-power-consumption-mode images that include preset characteristic information, where the preset characteristic information is characteristic information indicating that a user currently needs to use the terminal.

Operation S304: The first processor adjusts brightness of a screen of the terminal according to an identification result.

Figure 2:
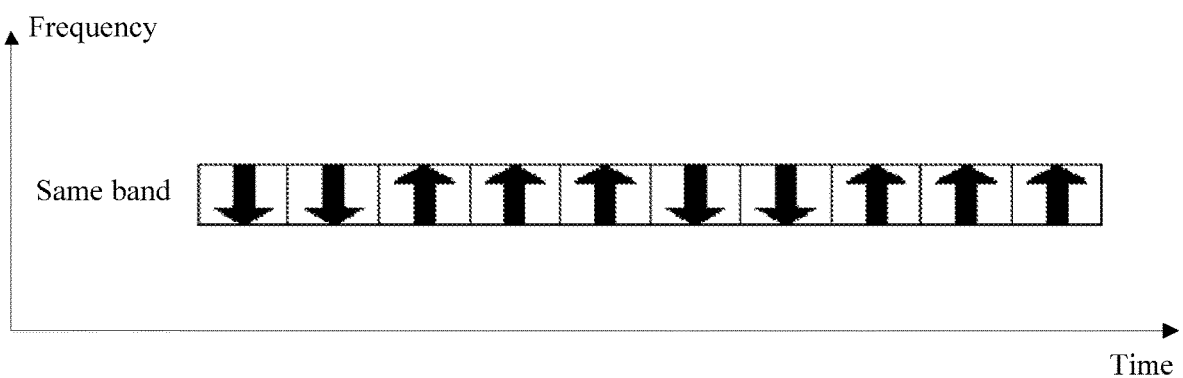
FIG. 2 is a schematic flowchart of a terminal control method according to an embodiment of the present disclosure.

Specifically, for operation S301 to operation S304, correspondingly refer to operation S201 to operation S204 in the embodiment provided in FIG. 2. Specific implementations are not described herein again.

Operation S304: When detecting that the front-facing camera switches from the low power consumption mode to a non-low power consumption mode, the second processor sends a second message to the first processor, where the second message indicates that the front-facing camera switches to the non-low power consumption mode.

Specifically, in this embodiment of the present disclosure, to reduce power consumption of the terminal, the first processor controls the camera to collect a low-power-consumption-mode image with a relatively low frame rate or relatively low resolution. Although the mode image can meet a requirement that the first processor uses the mode image to identify the preset characteristic information, the mode image cannot meet high-resolution and high-definition requirements of the user for a photographed photo. Therefore, after the second processor receives a photographing enabling instruction for the front-facing camera, the second processor needs to control the front-facing camera to output a non-low-power-consumption-mode image with a higher frame rate and/or higher resolution, so as to meet the photographing requirement of the user. When detecting that the front-facing camera switches from the low power consumption mode to the non-low power consumption mode, for example, when receiving an instruction for disabling a photographing function of the front-facing camera, the second processor notifies the first processor that the front-facing camera switches to the non-low power consumption mode.

Operation S305: After receiving the second message, the first processor stops controlling the front-facing camera, the second processor controls the front-facing camera to collect a non-low-power-consumption-mode image in the non-low power consumption mode, and the second processor performs subsequent processing on the non-low-power-consumption-mode image.

Specifically, after receiving the second message, the first processor stops controlling the front-facing camera, that is, stops controlling the front-facing camera to collect the low-power-consumption-mode image; instead, the second processor controls the front-facing camera to collect the non-low-power-consumption-mode image in the non-low power consumption mode; and the second processor performs subsequent image processing and the like on the non-low-power-consumption-mode image, so as to meet the normal photographing requirement of the user.

In this embodiment of the present disclosure, the method and a corresponding beneficial effect in the embodiment of FIG. 2 are retained. A main difference lies in that, in this embodiment of the present disclosure, after detecting that a normal photographing function of the front-facing camera is enabled, the second processor (for example, an application processor) controls the front-facing camera to collect and output the non-low-power-consumption-mode image with a frame rate or resolution higher than that of the low-power-consumption-mode image, so that the user can achieve a normal photographing effect when the user needs to use the photographing function of the front-facing camera. This not only implements a function of identifying the preset characteristic information by using the front-facing camera, but also retains and ensures a basic function of the front-facing camera serving as a camera sensor. In this way, both intelligence and low power consumption of the terminal are further ensured, and user experience is further improved.

In a specific application scenario, as shown in FIG. 4A and FIG. 4B, FIG. 4A and FIG. 4B are a schematic diagram of a specific application scenario of a terminal control method according to an embodiment of the present disclosure. In FIG. 4A and FIG. 4B, when a terminal is in a screen-off state or a sleep mode, a first processor identifies that there are a predetermined quantity (such as five frames) of consecutive low-power-consumption-mode images that include human eye information, and may determine that a user needs to use the terminal in this case. Therefore, the terminal may be adjusted according to an actual working status of the terminal. For example, when an application processor is in a sleep mode, the application processor is instructed to wake up and light up a screen; or when an application processor is in a waking state but a screen is in an off state, the application processor is instructed only to light up the screen of the terminal.

In a specific application scenario, as shown in FIG. 5A and FIG. 5B, FIG. 5A and FIG. 5B are a schematic diagram of another specific application scenario of a terminal control method according to an embodiment of the present disclosure. In FIG. 5A and FIG. 5B, when a terminal is in a screen-on state, a first processor identifies that no predetermined quantity (for example, five frames) of consecutive low-power-consumption-mode images include human eye information, and may determine that a screen of the terminal is out of sight of a user or a user does not need to use the terminal temporarily in this case. Therefore, brightness of the screen of the terminal may be adjusted, that is, an application processor is instructed to turn off the screen of the terminal, so that power consumption of the terminal is reduced.

In a specific application scenario, as shown in FIG. 6A and FIG. 6B, FIG. 6A and FIG. 6B are a schematic diagram of still another specific application scenario of a terminal control method according to an embodiment of the present disclosure. In FIG. 6A and FIG. 6B, when a photographing function of a front-facing camera is not enabled, the front-facing camera transmits a collected low-power-consumption-mode image with a relatively low frame rate or relatively low resolution to a first processor, so that the first processor identifies whether the image includes preset characteristic information. When a user taps a photographing device application and then enables the normal photographing function (for example, a selfie mode) of the front-facing camera, the front-facing camera immediately switches to collecting a non-low-power-consumption-mode image with a relatively high frame rate or relatively high resolution, so that the user can obtain a high-quality photo or video by means of photographing. For more specific implementation details and more actual application scenarios not listed one by one herein, refer to the method embodiments of FIG. 2 and FIG. 3.

To better implement the foregoing method embodiments in the embodiments of the present disclosure, the present disclosure further provides a related terminal for implementing the foregoing method embodiments. The following provides detailed descriptions with reference to a schematic structural diagram of a terminal shown in FIG. 7.

Figure 7:
FIG. 7 is a schematic structural diagram of another embodiment of a terminal according to the present disclosure.

As shown in FIG. 7, the terminal 10 may include at least one first processor 101 such as a coprocessor, at least one second processor 102 such as an application processor, at least one bus, a front-facing camera 103, a storage unit 104, at least one input unit 105, and at least one output unit 106. The bus is configured to implement communication connections between these components. The input unit 105 may be specifically a touch control panel of the terminal, including a touchscreen and a touch control screen and configured to detect an operation instruction (for example, an instruction for enabling a photographing function or an instruction for disabling a photographing function) on the touch control panel of the terminal. The output unit 106 may include a screen (Display) 1061 of the terminal, configured to output and display an image, data, or the like. The storage unit 104 may be a high-speed RAM display, or may be a non-volatile memory, for example, at least one magnetic display. Optionally, the storage unit 104 may be at least one display apparatus far away from the first processor 101 and the second processor 102. As a computer display medium, the storage unit 104 may include an operating system, a network communications unit, a user interface module, a terminal control program, and the like.

In the terminal 10 shown in FIG. 7, an operation processing capability of the first processor 101 is lower than an operation processing capability of the second processor 102. The storage unit 104 is configured to store program code. The second processor 102 is configured to invoke the program code stored by the storage unit 104, to perform the following step: when it is detected that the front-facing camera is in a low power consumption mode, sending a first message to the first processor 101. The first message indicates that the front-facing camera is in the low power consumption mode.

The first processor 101 is configured to invoke the program code stored by the storage unit 104, to perform the following steps: after the first message is received, controlling the front-facing camera to collect a low-power-consumption-mode image in the low power consumption mode; receiving the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting brightness of a screen of the terminal according to an identification result.

In an optional solution, the first processor 101 is configured to:

calculate a current ambient brightness value according to the low-power-consumption-mode image; and when receiving the low-power-consumption-mode image and identifying that there are a predetermined quantity of consecutive low-power-consumption-mode images that include the preset characteristic information, and detecting that the second processor 102 is in a waking state and the screen of the terminal is in an on state, adjust the brightness of the screen of the terminal according to the ambient brightness value, where a larger ambient brightness value indicates higher adjusted brightness of the screen of the terminal.

In another optional solution, the first processor 101 is configured to:

control, by the first processor 101, the second processor 102 to adjust the brightness of the screen of the terminal according to the identification result.

In still another optional solution, the first processor 101 is specifically configured to:

when receiving the low-power-consumption-mode image and identifying that there are a predetermined quantity of consecutive low-power-consumption-mode images that include the preset characteristic information, and detecting that the second processor 102 is in a sleep mode, wake up, by the first processor 101, the second processor 102 and instruct the second processor 102 to light up the screen of the terminal.

In still another optional solution, the first processor 101 is configured to:

when receiving the low-power-consumption-mode image and identifying that there are a predetermined quantity of consecutive low-power-consumption-mode images that include the preset characteristic information, and detecting that the second processor 102 is in a waking state and the screen of the terminal is in an off state, instruct, by the first processor 101, the second processor 102 to light up the screen of the terminal.

In still another optional solution, the first processor 101 is configured to:

when receiving the low-power-consumption-mode image and identifying that no predetermined quantity of consecutive low-power-consumption-mode images include the preset characteristic information, and detecting that the screen of the terminal is in an on state, instruct the second processor 102 to turn off the screen of the terminal.

In still another optional solution, the first processor 101 is further configured to calculate a current ambient brightness value according to the low-power-consumption-mode image.

The first processor 101 is specifically configured to send the ambient brightness value to the second processor 102.

The second processor 102 is specifically configured to adjust the brightness of the screen of the terminal according to the ambient brightness value. A larger ambient brightness value indicates higher adjusted brightness of the screen of the terminal.

In still another optional solution, the second processor 102 is further configured to: when detecting that the front-facing camera switches from the low power consumption mode to a non-low power consumption mode, send a second message to the first processor 101. The second message indicates that the front-facing camera switches to the non-low power consumption mode.

The first processor 101 is further configured to: after receiving the second message, stop controlling the front-facing camera.

The second processor 102 is further configured to: control the front-facing camera to collect a non-low-power-consumption-mode image in the non-low power consumption mode, and perform subsequent processing on the non-low-power-consumption-mode image.

In still another optional solution, the first processor 101 is a coprocessor, and the second processor 102 is an application processor.

It may be understood that, for functions of the modules in the terminal 10, refer to specific implementations in the method embodiments of FIG. 2 and FIG. 3. Details are not described herein again.

An embodiment of the present disclosure further provides a computer storage medium. The computer storage medium may store a program. When the program runs, some or all of steps in either of the terminal control methods recorded in the foregoing method embodiments are performed.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in this specification are preferred embodiments, and the related actions and modules are not necessarily mandatory to the present disclosure.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like, and may be specifically a processor in a computer device) to perform all or some of the steps of the foregoing methods described in the embodiments of the present disclosure. The foregoing storage medium includes: any medium that can store program code, such as a USB flash drive, a removable hard disk, a magnetic disk, an optical disc, a read-only memory (English: read-only memory, ROM for short), or a random access memory (English: random access memory, RAM for short).

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A communication apparatus, comprising:
a receiver configured to receive first configuration information that is of a frame format configuration and that is received from a network device, wherein the first configuration information is used for determining locations, in a radio frame, of a full-duplex subframe and a normal subframe in the radio frame based on the first configuration information, and the first configuration information is a bitmap, and comprises N pieces of first indication information arranged in sequence as the bitmap, wherein N is a positive integer and is a quantity of subframes comprised in one radio frame, and each piece of the first indication information corresponds to one subframe in the radio frame and is used exclusively for indicating whether the corresponding subframe is the full-duplex subframe or the normal subframe; and
a processor configured to determine the locations, in the radio frame, of the full-duplex subframe and the normal subframe in the radio frame based on the first configuration information, wherein
the full-duplex subframe is a subframe in which the network device can simultaneously perform downlink transmission and uplink reception in the radio frame, and the normal subframe is a subframe in the radio frame other than a full-duplex subframe.

2. The apparatus according to claim 1, wherein
the processor is further configured to: separately determine, based on the N pieces of first indication information arranged in sequence, whether a subframe corresponding to each piece of the first indication information is a full-duplex subframe or a normal subframe, and determine the locations of the full-duplex subframes and the normal subframes in the radio frame in order of the N pieces of first indication information.

3. The apparatus according to claim 1, wherein
the first configuration information comprises a plurality of pieces of second indication information, wherein each piece of the second indication information is used for indicating an available frame format configuration in a cell, and different pieces of the second indication information are used for indicating different frame format configurations; and
the processor is further configured to:
if a subframe in one location in the radio frame is an uplink subframe based on frame format configurations indicated by some of the plurality of pieces of second indication information and the subframe is a downlink subframe based on frame format configurations indicated by other pieces of second indication information in the plurality of pieces of second indication information, determine that the subframe in the one location is a full-duplex subframe; or
if a subframe in one location in the radio frame is an uplink subframe based on frame format configurations indicated by some of the plurality of pieces of second indication information and the subframe is a special subframe based on frame format configurations indicated by other pieces of second indication information in the plurality of pieces of second indication information, determine that the subframe in the one location is a full-duplex subframe; or
if a subframe in one location in the radio frame is a downlink subframe based on frame format configurations indicated by some of the plurality of pieces of second indication information and the subframe is a special subframe based on frame format configurations indicated by other pieces of second indication information in the plurality of pieces of second indication information, determine, by the terminal device, that the subframe in the one location is a full-duplex subframe.

4. The apparatus according to claim 1, wherein the processor is further configured to:
after determining the locations, in the radio frame, of the full-duplex subframe and the normal subframe in the radio frame based on the received first configuration information, separately perform radio measurement on the full-duplex subframe and the normal subframe.

5. The apparatus according to claim 1, wherein
the receiver is further configured to: receive, from the network device, second configuration information of a frame format configuration for the apparatus, wherein second configuration information received from the network device for different apparatuses is different; and
the processor is further configured to determine, based on the second configuration information, the frame format configuration to be used by the apparatus.

6. The apparatus according to claim 5, wherein the receiver is configured to:
receive the first configuration information broadcast by the network device; and
receive the second configuration information that is received from the network device to the apparatus using dedicated signaling.

7. A communication apparatus, comprising:
a processor configured to determine first configuration information of a frame format configuration, wherein the first configuration information is used for determining, by a terminal device, locations, in a radio frame, of a full-duplex subframe and a normal subframe in the radio frame; and
a transmitter configured to send the first configuration information to the terminal device, wherein
the full-duplex subframe is a subframe in which the apparatus can simultaneously perform downlink transmission and uplink reception in the radio frame, and the normal subframe is a subframe in the radio frame other than a full-duplex subframe,
wherein the first configuration information is a bitmap, and comprises N pieces of first indication information arranged in sequence as the bitmap, wherein N is a positive integer and is a quantity of subframes comprised in one radio frame, and each piece of the first indication information corresponds to one subframe in the radio frame and is used exclusively for indicating whether the corresponding subframe is the full-duplex subframe or the normal subframe.

8. The apparatus according to claim 7, wherein the first configuration information further comprises:
a plurality of pieces of second indication information, wherein each piece of the second indication information is used for indicating an available frame format configuration in a cell, and different pieces of second indication information are used for indicating different frame format configurations.

9. The apparatus according to claim 7, wherein the transmitter is further configured to:
send second configuration information of the frame format configuration for the terminal device to the terminal device, wherein second configuration information sent for different terminal devices is different.

10. The apparatus according to claim 9, wherein
the transmitter is configured to: broadcast the first configuration information; and
send the second configuration information to the terminal device by using dedicated signaling.

11. A frame format configuration method, comprising:
receiving, by a terminal device, first configuration information that is of a frame format configuration and that is received from a network device, wherein the first configuration information is used for determining, by the terminal device, locations, in a radio frame, of a full-duplex subframe and a normal subframe in the radio frame based on the first configuration information, the first configuration information is a bitmap, and comprises N pieces of first indication information arranged in sequence as the bitmap, wherein N is a positive integer and is a quantity of subframes comprised in one radio frame, and each piece of the first indication information corresponds to one subframe in the radio frame and is used exclusively for indicating whether the corresponding subframe is the full-duplex subframe or the normal subframe; and
determining, by the terminal device, the locations, in the radio frame, of the full-duplex subframe and the normal subframe in the radio frame based on the received first configuration information, wherein
the full-duplex subframe is a subframe in which the network device can simultaneously perform downlink transmission and uplink reception in the radio frame, and the normal subframe is a subframe in the radio frame other than a full-duplex subframe.

12. The method according to claim 11, wherein
the determining, by the terminal device, the locations, in the radio frame, of the full-duplex subframe and the normal subframe in the radio frame based on the received first configuration information comprises:
separately determining, by the terminal device based on the N pieces of first indication information arranged in sequence, whether the subframe corresponding to each piece of the first indication information is a full-duplex subframe or a normal subframe, and determining the locations of the full-duplex subframes and the normal subframes in the radio frame in order of the N pieces of first indication information.

13. The method according to claim 11, wherein
the first configuration information comprises a plurality of pieces of second indication information, wherein each piece of the second indication information is used for indicating an available frame format configuration in a cell, and different pieces of second indication information are used for indicating different frame format configurations; and
the determining, by the terminal device, the locations, in the radio frame, of the full-duplex subframe and the normal subframe in the radio frame based on the received first configuration information comprises:
if a subframe in one location in the radio frame is an uplink subframe based on frame format configurations indicated by some of the plurality of pieces of second indication information and the subframe is a downlink subframe based on frame format configurations indicated by other pieces of second indication information in the plurality of pieces of second indication information, determining, by the terminal device, that the subframe in the one location is a full-duplex subframe; or
if a subframe in one location in the radio frame is an uplink subframe based on frame format configurations indicated by some of the plurality of pieces of second indication information and the subframe is a special subframe based on frame format configurations indicated by other pieces of second indication information in the plurality of pieces of second indication information, determining, by the terminal device, that the subframe in the one location is a full-duplex subframe; or
if a subframe in one location in the radio frame is a downlink subframe based on frame format configurations indicated by some of the plurality of pieces of second indication information and the subframe is a special subframe based on frame format configurations indicated by other pieces of second indication information in the plurality of pieces of second indication information, determining, by the terminal device, that the subframe in the one location is a full-duplex subframe.

14. The method according to claim 11, wherein after the determining, by the terminal device, the locations, in the radio frame, of the full-duplex subframe and the normal subframe in the radio frame based on the received first configuration information, the method further comprises:
separately performing, by the terminal device, radio measurement on the full-duplex subframe and the normal subframe.

15. The method according to claim 11, further comprising:
receiving, by the terminal device, second configuration information of the frame format configuration for the terminal device that is received from the network device, wherein second configuration information received from the network device for different terminal devices is different; and
determining, by the terminal device based on the received second configuration information, the frame format configuration to be used by the terminal device.

16. The method according to claim 15, wherein
the receiving, by a terminal device, first configuration information that is of a frame format configuration and that is received from a network device comprises: receiving, by the terminal device, the first configuration information broadcast by the network device; and the receiving, by the terminal device, second configuration information of the frame format configuration for the terminal device that is received from the network device comprises: receiving, by the terminal device, the second configuration information that is received from the network device to the terminal device using dedicated signaling.

17. A frame format configuration method, comprising:

determining, by a network device, first configuration information of a frame format configuration, wherein the first configuration information is used for determining, by a terminal device, locations, in a radio frame, of a full-duplex subframe and a normal subframe in the radio frame, wherein the first configuration information is a bitmap, and comprises N pieces of first indication information arranged in sequence as the bitmap, wherein N is a positive integer and is a quantity of subframes comprised in one radio frame, and each piece of the first indication information corresponds to one subframe in the radio frame and is used exclusively for indicating whether the corresponding subframe is the full-duplex subframe or the normal subframe; and sending, by the network device, the determined first configuration information to the terminal device, wherein the full-duplex subframe is a subframe in which the network device can simultaneously perform downlink transmission and uplink reception in the radio frame, and the normal subframe is a subframe in the radio frame other than a full-duplex subframe.

18. The method according to claim 17, wherein the first configuration information further comprises:

a plurality of pieces of second indication information, wherein each piece of the second indication information is used for indicating an available frame format configuration in a cell, and different pieces of second indication information are used for indicating different frame format configurations.

19. The method according to claim 17, further comprising:

sending, by the network device, second configuration information of the frame format configuration for the terminal device to the terminal device, wherein second configuration information sent by the network device for different terminal devices is not completely the same.

20. The method according to claim 19, wherein the sending, by the network device, the determined first configuration information to the terminal device comprises: broadcasting, by the network device, the first configuration information; and sending, by the network device, second configuration information of the frame format configuration for the terminal device to the terminal device, wherein the network device sends the second configuration information to the terminal device using dedicated signaling.

* * * * *

UNITED STATES PATENT AND TRADEMARK OFFICE
CERTIFICATE OF CORRECTION

PATENT NO. : 11,304,143 B2
APPLICATION NO. : 16/115267
DATED : April 12, 2022
INVENTOR(S) : Zhengwei Gong It is certified that error appears in the above-identified patent and that said Letters Patent is hereby corrected as shown below:

On the Title Page

The Abstract should be replaced with the Abstract as shown below:

ABSTRACT
A frame format configuration method is provided. The terminal device includes: a receiver, configured to receive first configuration information that is of a frame format configuration and that is sent by a network device, where the first configuration information is used for determining, by the terminal device, locations, in a radio frame, of a full-duplex subframe and a normal subframe in the radio frame based on the first configuration information; and a processor, configured to determine the locations, in the radio frame, of the full-duplex subframe and the normal subframe in the radio frame based on the first configuration information, where the full-duplex subframe is a subframe in which the network device can simultaneously perform downlink transmission and uplink reception in the radio frame, and the normal subframe is a subframe in the radio frame other than the full-duplex subframe.

In the Specification

Reprint the Specification as shown on the attached pages.

Signed and Sealed this
Twenty-fourth Day of September, 2024

Katherine Kelly Vidal
*Director of the United States Patent and Trademark Office*

TERMINAL DEVICE, NETWORK DEVICE, FRAME FORMAT CONFIGURATION METHOD, AND SYSTEM

CROSS-REFERENCE TO RELATED APPLICATIONS

This application is a continuation of International Application No. PCT/CN2017/074808, filed on February 24, 2017, which claims priority to Chinese Patent Application No. 201610113290.X, filed on February 29, 2016. The disclosures of the aforementioned applications are hereby incorporated by reference in their entireties.

TECHNICAL FIELD

The present invention relates to the field of wireless communications technologies, and in particular, to a terminal device, a network device, a frame format configuration method, and a system.

BACKGROUND

In a wireless communications system using a time division duplex (TDD) manner, uplink transmission and downlink transmission occupy different time periods such as a timeslot or a subframe.

Using a Long Term Evolution-time division duplex (TDD LTE) system as an example, uplink transmission and downlink transmission occupy different subframes, to avoid interference between a receive channel and a transmit channel. In the TDD LTE system, one radio frame includes 10 subframes, and the 10 subframes are configured as uplink subframes, downlink subframes, or special subframes.

When supporting full duplex, a network device may simultaneously perform downlink transmission to one terminal device and receive uplink transmission from another terminal device in a subframe, that is, the subframe is a downlink subframe for the terminal device, and the subframe is an uplink subframe for the another terminal device. Herein, such a subframe is referred to as a "full-duplex subframe".

If a terminal device does not learn of subframes that are full-duplex subframes in a radio frame, the terminal device probably cannot avoid strong interference that may be brought by another terminal device from different transmission directions.

SUMMARY

Embodiments of the present invention provide a terminal device, a network device, a frame format configuration method, and a system, so that the terminal device learns of subframes that are full-duplex subframes in a radio frame.

According to a first aspect, an embodiment of the present invention provides a frame format configuration method. The method includes: sending, by a network device, first configuration information to a terminal device, where the first configuration information is used for determining, by the terminal device, locations, in a radio frame, of a full-duplex subframe and a normal subframe in the radio frame; and after receiving the first configuration information that is of the frame format configuration and that is sent by the network device, determining, by the terminal device, the locations, in the radio frame, of the full-duplex subframe and the normal subframe in the radio frame based on the received first configuration information, where the full-duplex subframe is a subframe in which the network device can simultaneously perform downlink transmission and uplink reception in the radio frame, and the normal subframe is a subframe in the radio frame other than the full-duplex subframe.

In the method, the terminal device can determine, based on the first configuration information that is sent by the network device, subframes that are full-duplex subframes in the radio frame, so that strong interference that may be brought by another terminal device from different transmission directions can be avoided as much as possible.

In an optional implementation, the first configuration information includes N pieces of first indication information arranged in sequence, where N is a positive integer and is a quantity of subframes included in one radio frame, and each piece of first indication information corresponds to one subframe in the radio frame and is used for indicating whether the corresponding subframe is the full-duplex subframe or the normal subframe; and the terminal device separately determines, based on the N pieces of first indication information arranged in sequence, whether the subframe corresponding to each piece of first indication information is the full-duplex subframe or the normal subframe, and determining the locations of the full-duplex subframe and the normal subframe in the radio frame in order of the N pieces of first indication information.

In the method, an optional implementation solution of the first configuration information is provided, and the terminal device can separately determine, based on the N pieces of first indication information, whether a corresponding subframe is a full-duplex subframe or a normal subframe.

In an optional implementation, the first configuration information includes a plurality of pieces of second indication information, where each piece of second indication information is used for indicating an available frame format configuration in a cell, and different pieces of second indication information are used for indicating different frame format configurations; and if the terminal device determines that a subframe in one location in the radio frame is an uplink subframe based on frame format configurations indicated by some of the plurality of pieces of second indication information and is a downlink subframe based on frame format configurations indicated by other pieces of second indication information in the plurality of pieces of second indication information, the terminal device determines that the subframe in the one location is a full-duplex subframe; or if a subframe in one location in the radio frame is an uplink subframe based on frame format configurations indicated by some of the plurality of pieces of second indication information and is a special subframe based on frame format configurations indicated by other pieces of second indication information in the plurality of pieces of second indication information, the terminal device determines that the subframe in the one location is a full-duplex subframe; or if a subframe in one location in the radio frame is a downlink subframe based on frame format configurations indicated by some of the plurality of pieces of second indication information and is a special subframe based on frame format configurations indicated by other pieces of second indication information in the plurality of pieces of second indication information, the terminal device determines that the subframe in the one location is a full-duplex subframe.

In the method, an optional implementation solution of the first configuration information is provided, and the terminal device can determine, based on various available frame format configurations in a cell, subframes that are full-duplex subframes and subframes that are normal subframes. In addition, in the method, the terminal device may be notified of the available frame format configurations in the cell.

In an optional implementation, after determining the locations, in the radio frame, of the full-duplex subframe and the normal subframe in the radio frame based on the received first configuration information, the terminal device separately performs radio measurement on the full-duplex subframe and the normal subframe.

In this way, the terminal device may separately obtain interference level values of the two types of subframes to achieve an optimal link adaptation effect.

In an optional implementation, the terminal device further receives second configuration information of a frame format configuration for the terminal device that is sent by the network device, where second configuration information sent by the network device for different terminal devices is not completely the same; and the terminal device determines, based on the received second configuration information, the frame format configuration to be used by the terminal device.

In this way, the terminal device can determine the frame format configuration that needs to be used by the terminal device, to facilitate subsequent signaling and data transmission.

In an optional implementation, the terminal device receives the first configuration information broadcast by the network device; and receives the second configuration information that is sent by the network device to the terminal device by using dedicated signaling.

In the method, optional implementation solutions for receiving the first configuration information and the second configuration information by the terminal device are provided.

According to a second aspect, an embodiment of the present invention provides a terminal device. The terminal device has a function of implementing the behaviors of the terminal device in the foregoing method. The function may be implemented by using hardware, or may be implemented by executing corresponding software by hardware. The hardware or the software includes one or more modules corresponding to the foregoing function.

In an optional implementation solution, a structure of the terminal device includes a processor and a receiver. The processor is configured to support performing, by the terminal device, the corresponding function in the foregoing method. The receiver is configured to support receiving, by the terminal device, the configuration information used in the foregoing method and sent by the network device. Optionally, the terminal device may further include a transmitter, configured to send data and/or signaling to the network device and/or another terminal device. The terminal device may further include a memory. The memory is configured to be coupled to the processor, and the memory stores a necessary program instruction and data for the terminal device.

According to a third aspect, an embodiment of the present invention provides a network device. The network device has a function of implementing the behaviors of the network device in the foregoing method. The function may be implemented by using hardware, or may be implemented by executing corresponding software by hardware. The hardware or the software includes one or more modules corresponding to the foregoing function.

In an optional implementation solution, a structure of the network device includes a transmitter and a processor. The transmitter is configured to support sending, by the network device, the configuration information used in the foregoing method to the terminal device. The processor is configured to support performing, by the network device, the corresponding function in the foregoing method. Optionally, the network device further includes a memory. The memory is configured to be coupled to the processor, and the memory stores a necessary program instruction and data for the network device.

According to a fourth aspect, an embodiment of the present invention provides a wireless communications system. The wireless communications system includes the terminal device and the network device according to any one of the first aspect to the third aspect.

According to a fifth aspect, an embodiment of the present invention provides a computer storage medium, configured to store a computer software instruction used by the terminal device according to any one of the first aspect to the fourth aspect, where the computer software instruction includes a program designed for implementing the foregoing aspects.

According to a sixth aspect, an embodiment of the present invention provides a computer storage medium, configured to store a computer software instruction used by the network device according to any one of the first aspect to the fourth aspect, where the computer software instruction includes a program designed for implementing the foregoing aspects.

BRIEF DESCRIPTION OF DRAWINGS

Figure 4:
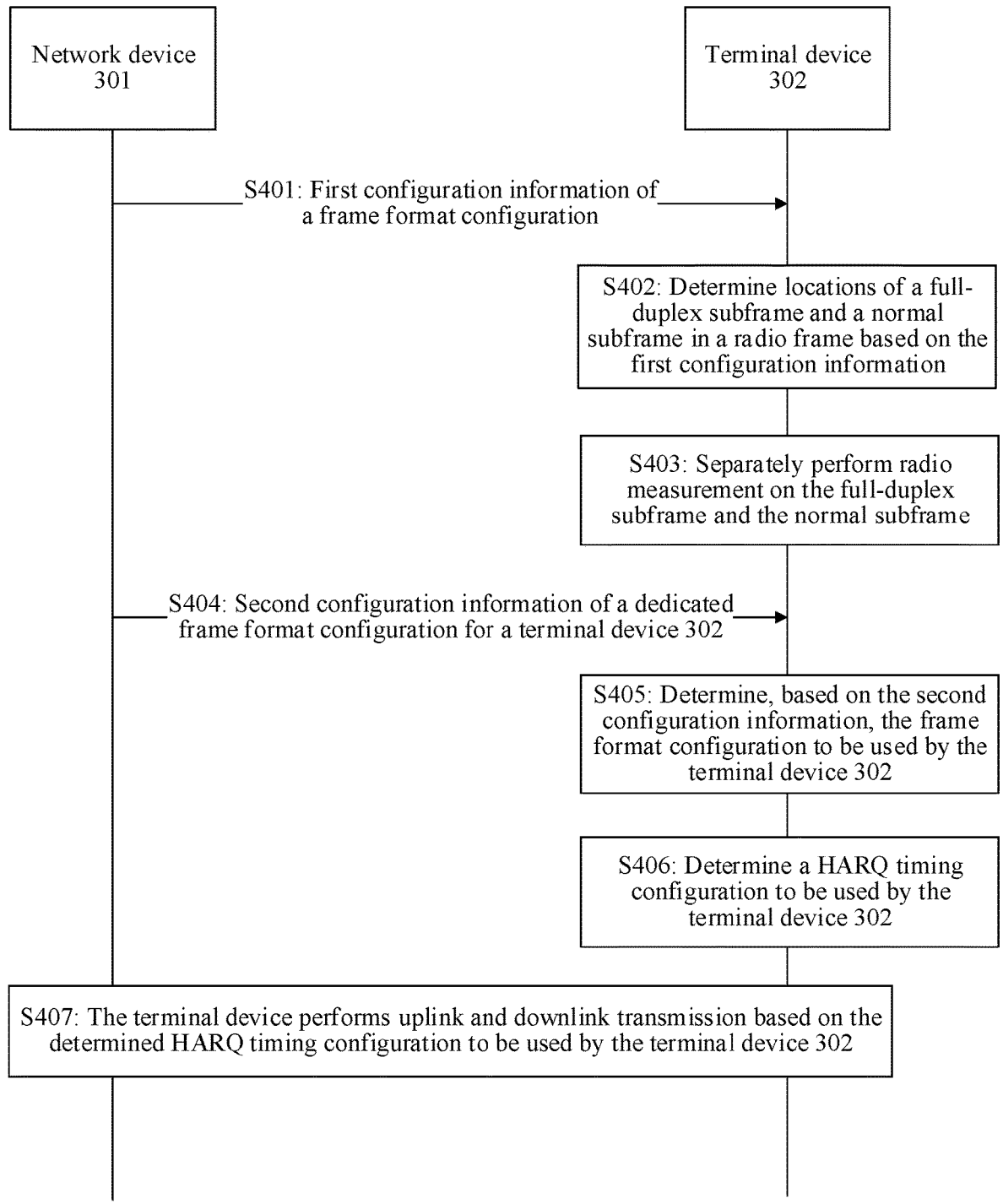
FIG. 4A and FIG. 4B are a schematic diagram of a specific application scenario of a terminal control method according to an embodiment of the present disclosure.
Figure 5:
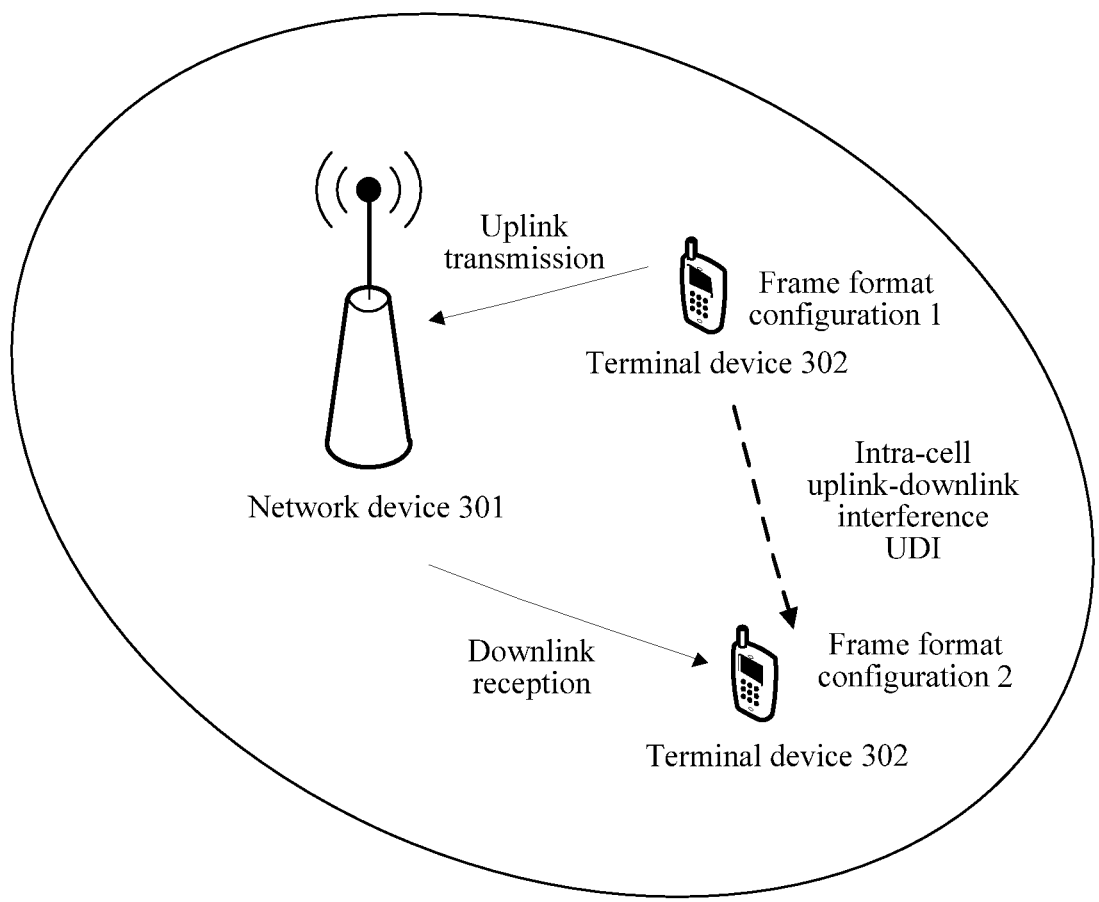
FIG. 5A and FIG. 5B are a schematic diagram of another specific application scenario of a terminal control method according to an embodiment of the present disclosure.
Figure 6:
FIG. 6A and FIG. 6B are a schematic diagram of still another specific application scenario of a terminal control method according to an embodiment of the present disclosure.
Figure 8:
Figure 9:

FIG. 1 is a schematic diagram of uplink and downlink transmission by using a frequency division duplex (FDD) manner;

FIG. 2 is a schematic diagram of uplink and downlink transmission by using a TDD manner;

FIG. 3 is a schematic structural diagram of a wireless communications system according to an embodiment of the present invention;

FIG. 4 is a flowchart of a frame format configuration method according to an embodiment of the present invention;

FIG. 5 is a schematic diagram of uplink and downlink interference in a cell;

FIG. 6 is a schematic structural diagram of a terminal device according to an embodiment of the present invention;

FIG. 7 is a schematic diagram of an optional hardware implementation of the terminal device shown in FIG. 6;

FIG. 8 is a schematic structural diagram of a network device according to an embodiment of the present invention; and FIG. 9 is a schematic diagram of an optional hardware implementation of the network device shown in FIG. 8.

DESCRIPTION OF EMBODIMENTS

In embodiments of the present invention, a terminal device may determine locations of a full-duplex subframe and a normal subframe in a radio frame based on first configuration information that is of a frame format configuration and that is received from a network device.

The network device supports dull duplex, and may simultaneously perform downlink transmission to one terminal device and receive uplink transmission from another terminal device. Compared with a case in which previously, a network device can only perform uplink reception or only perform downlink transmission in a same subframe, a throughput of a base station can be greatly improved.

To make the objectives, solutions, and advantages of the embodiments of the present invention more understandable, the following provides detailed descriptions. The detailed descriptions provide various implementations of an apparatus and/or a method by using block diagrams, flowcharts, and/or examples. These block diagrams, flowcharts, and/or examples include one or more functions and/or operations. Persons skilled in the art may understand that each function and/or operation in the block diagrams, the flowcharts, and/or the examples can be performed independently and/or jointly by using various hardware, software, and firmware, and/or any combination thereof.

The following explains same descriptions of the embodiments of the present invention. It should be noted that, the explanations are intended to facilitate understanding of the embodiments of the present invention, but should not be construed as limiting the protection scope of the embodiments of the present invention.

1. Full duplex

In a current commercial wireless communications system, limited by an interference processing capability of a communications device (for example, a network device or a terminal device), it is required that the communications device cannot simultaneously transmit and receive signals on a same radio resource (for example, a time-frequency resource in an LTE system); otherwise, severe interference is caused between transmitted signal and received signals, greatly reducing communication quality.

Using two standards of a current LTE system as an example, in an FDD LTE system using an FDD manner, as shown in FIG. 1, a same communications device separately receives and transmits signals at different frequencies and at a same moment. In a TDD LTE system using a TDD manner, as shown in FIG. 2, a same communications device separately receives and transmits signals at a same frequency and at different moments.

As interference processing capabilities of communications devices, especially network devices such as base stations are greatly improved, some network devices can support transmission and reception at a same frequency and at a same moment. Such a manner is referred to as a "full duplex" manner.

When the full duplex manner is used, compared with a duplex manner in which only transmission or only reception is supported at a same frequency and at a same moment, spectrum efficiency is doubled.

In the embodiments of the present invention, the network device supports full duplex, that is, the network device can perform reception and transmission at a same time and at a same frequency.

Specifically, for each subframe of a radio frame, if a network device can simultaneously perform downlink transmission and uplink reception in a subframe, such a subframe is referred to as a "full-duplex subframe".

Another subframe in the radio frame other than the full-duplex subframe is a normal subframe.

2. Frame format configuration

The frame format configuration refers to locations, in a radio frame, of various subframes included in the radio frame.

For example, if a subframe is classified into an uplink subframe or a downlink subframe, the frame format configuration refers to locations, in a radio frame, of uplink subframes and downlink subframes in the radio frame.

For another example, if a subframe is classified into an uplink subframe, a downlink subframe, or a special subframe, the frame format configuration refers to locations, in a radio frame, of uplink subframes, downlink subframes, and special subframes in the radio frame.

For another example, in a scenario in which a terminal device can perform device-to-device (D2D) communication, subframe types may further include a subframe used for performing D2D transmission.

To describe the frame format configuration more vividly, a current TDD LTE system is used as an example. One radio frame may have a plurality of frame format configurations, which are referred to as uplink-downlink configurations (Uplink-downlink configuration). Currently, the TDD LTE protocol has defined seven frame format configurations listed in Table 1. "D" represents a downlink subframe, "S" represents a special subframe, and "U" represents an uplink subframe.

Table 1 TDD LTE frame format configuration

| Uplink-downlink configuration (Uplink-downlink Configuration) | Downlink-to-uplink switch-point periodicity (Downlink-to-Uplink Switch-point periodicity) | Subframe number (Subframe number) | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In an embodiment of the present invention, a subframe is classified into a normal subframe or a full-duplex subframe. As described above, the full-duplex subframe is a subframe in which a network device can simultaneously perform downlink transmission and uplink reception, and another subframe in the radio frame other than the full-duplex subframe is a normal subframe.

The TDD LTE system is still used as an example. If the network device configures an uplink-downlink configuration 0 for some terminal devices in a cell and configures an uplink-downlink configuration 1 for other terminal devices, a subframe 4 and a subframe 9 are full-duplex subframes and other subframes are normal subframes. In the subframe 4, the terminal device for which the uplink-downlink configuration 0 is configured performs uplink transmission and the terminal device for which the uplink-downlink configuration 1 is configured performs downlink reception.

Corresponding to a network device that simultaneously serves terminal devices having different uplink-downlink configurations, reception and transmission can be simultaneously performed, thereby implementing full duplex.

For another example, if the network device configures an uplink-downlink configuration 5 for some terminal devices in a cell and configures an uplink-downlink configuration 6 for other terminal devices, subframes 3, 4, 6, 7, 8 are all full-duplex subframes and other subframes are normal subframes. For the uplink-downlink configuration 6, the subframe 6 is a special subframe. Based on a definition in the current TDD LTE protocol, the special subframe includes an uplink pilot timeslot (UpPTS), a downlink pilot timeslot (DwPTS), and a guard period (GP). Therefore, the network device can perform uplink reception in the UpPTS of the subframe 6. In addition, the network device can simultaneously perform downlink transmission in the subframe 6 based on the uplink-downlink configuration 5. Therefore, the subframe 6 is also a full-duplex subframe.

3. System and network

The terms "system" and "network" are often used interchangeably in the embodiments of the present invention. The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing describes the same descriptions of the embodiments of the present invention, and the following describes in detail the embodiments of the present invention with reference to the accompany drawings.

FIG. 3 is a schematic structural diagram of a wireless communications system according to an embodiment of the present invention. As shown in FIG. 3, the wireless communications system includes a network device 301 and a terminal device 302. Within coverage of a cell managed by the network device 301, one or more terminal devices 302 may exist. If a plurality of terminal devices 302 exist, frame format configurations used by the plurality of terminal devices 302 may be different.

For example, as shown in FIG. 3, there are three terminal devices 302 within coverage of a cell managed by the network device 301, two of the three terminal devices use a frame format configuration 1, and the other one uses a frame format configuration 2. The frame format configuration manner is different from a frame format configuration manner in a previous wireless communications system in which all terminal devices use a same frame format configuration in one cell, and the case in which different terminal devices 302 in one cell use different frame format configurations in the embodiments of the present invention does not occur.

Use of different frame format configurations by different terminal devices improves implementation flexibility, and may also improve transmission resource utilization of the entire cell.

Because different terminal devices in one cell use different frame format configurations, the network device 301 may simultaneously perform downlink transmission and uplink reception in some subframes, and the subframes are full-duplex subframes.

A communications standard of the wireless communications system shown in FIG. 3 includes, but is not limited to: a Global System for Mobile Communications (GSM), Code Division Multiple Access (CDMA) IS-95, Code Division Multiple Access (CDMA) 2000, time division-Synchronous Code Division Multiple Access (TD-SCDMA), Wideband Code Division Multiple Access (WCDMA), time division duplex-Long Term Evolution (TDD LTE), frequency division duplex-Long Term Evolution (FDD LTE), Long Term Evolution-Advanced (LTE-advanced), a personal handy-phone system (PHS), Wireless Fidelity (WiFi) stipulated in 802.11-series protocols, Worldwide Interoperability for Microwave Access (WiMAX), and various future evolved wireless communications systems.

The terminal device 302 may be a wireless terminal. The wireless terminal may refer to a device that provides a user with voice and/or data connectivity, a handheld device with a radio connection function, or another processing device connected to a wireless modem. The wireless terminal may communicate with one or more core networks by using a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile terminal, a remote station, an access point, a remote terminal, an access terminal, a user terminal, a user agent, a user device, or user equipment.

The network device 301 may include a base station, or a radio resource management device configured to control a base station, or include a base station and a radio resource management device configured to control the base station. The base station may be a macro base station or a micro base station, for example, a small cell or a pico cell, or the base station may be a home base station, for example, a home NodeB (HNB) or a home eNodeB (HeNB), and the base station may also include a relay node.

For example, for LTE systems such as a TDD LTE, FDD LTE, or LTE-A system, the network device 301 in the wireless communications system provided in this embodiment of the present invention may be an evolved NodeB (eNodeB), and the terminal device 302 may be UE. For a TD-SCDMA system or a WCDMA system, the network device 301 in the wireless communications system provided in this embodiment of the present invention may include: a NodeB and/or a radio network controller (RNC), and the terminal device 302 may be UE. For a GSM system, the network device 301 provided in this embodiment of the present invention may include a base transceiver station (BTS) and/or a base station controller (BSC), and the terminal device 302 is a mobile station (MS). For a WiFi system, the network device 301 may include an access point (AP) and/or an access controller (AC), and the terminal device 302 may be a station (STA).

FIG. 4 is a flowchart of interaction between a network device 301 and a terminal device 302. As shown in the FIG. 4, the procedure includes the following steps.

S401: The network device 301 determines first configuration information of a frame format configuration, and sends the determined first configuration information to the terminal device 302.

S402: After receiving the first configuration information, the terminal device 302 determines locations of a full-duplex subframe and a normal subframe in a radio frame.

S403: The terminal device 302 separately performs radio measurement on the full-duplex subframe and the normal subframe based on the determined locations of the full-duplex subframe and the normal subframe in the radio frame.

S404: The network device 301 sends second configuration information of a dedicated frame format configuration for the terminal device 302 to the terminal device 302.

S405: The terminal device 302 determines, based on the received second configuration information, the frame format configuration to be used by the terminal device 302.

S406: The terminal device 302 determines, based on the determined frame format configuration to be used by the terminal device 302, a HARQ timing configuration to be used by the terminal device 302.

S407: The terminal device 302 performs uplink and downlink transmission based on the determined HARQ timing configuration to be used by the terminal device 302.

The following describes in detail the procedure shown in FIG. 4.

S401: The network device 301 determines first configuration information of a frame format configuration, and sends the determined first configuration information to the terminal device 302.

The first configuration information may be implemented in a plurality of manners, provided that the terminal device 302 can determine the locations of the full-duplex subframe and the normal subframe in the radio frame based on the first configuration information.

The following describes two possible implementations.

Manner 1

The first configuration information includes first indication information, and the first indication information is used for indicating the locations, in the radio frame, of the full-duplex subframe and the normal subframe in the radio frame.

For example, the network device 301 may use a bitmap manner when generating the first indication information.

It is assumed that one radio frame includes 10 subframes. The first indication information may be generated by using a bitmap shown in the following Table 2. 1 indicates that a corresponding subframe is a full-duplex subframe, and 0 indicates that a corresponding subframe is a normal subframe.

Table 2 First indication information bitmap

| 0 | 0 | 0 | 1 | 1 | 0 | 0 | 1 | 1 | 1 |
|---|---|---|---|---|---|---|---|---|---|

The network device 301 may send the first indication information to the terminal device 302 by using a broadcast message or dedicated signaling.

For example, the network device 301 may place the first indication information in a system information block (System Information Block, SIB) and send the SIB to all terminal devices in one cell.

For another example, the network device 301 may send dedicated signaling, for example, a Radio Resource Control (Radio Resource Control, RRC) message, to the terminal device 302. The dedicated signaling carries the first indication information by using an RRC subframe assignment (RRCSubframeAssignment) field. A length of the field may be 10 bits, that is, a quantity of subframes in one radio frame.

Manner 2

The first configuration information includes a plurality of pieces of second indication information, and each piece of second indication information is used for indicating an available frame format configuration in a cell.

The network device 301 may also send the plurality of pieces of second indication information by using a broadcast message or dedicated signaling.

For example, the network device 301 places the plurality of pieces of second indication information in a SIB and sends the SIB to the terminal device 302. The second indication information may be carried by using a SIB subframe assignment (SIBSubframeAssignment) field, and the plurality of pieces of second indication information are respectively carried by using the following fields:

SIBSubframeAssignment 0;

SIBSubframeAssignment 1;

SIBSubframeAssignment 2;

...

and SIBSubframeAssignment M−1, where M is a positive integer greater than 1, and represents a quantity of the plurality of pieces of second indication information.

For example, a TDD LTE system is used as an example. If M=2, and the SIBSubframeAssignment 0 is an uplink-downlink configuration 0 and the SIBSubframeAssignment 1 is an uplink-downlink configuration 1, a subframe 4 and a subframe 9 are full-duplex subframes, and remaining subframes are normal subframes.

S402: After receiving the first configuration information, the terminal device 302 determines locations of a full-duplex subframe and a normal subframe in a radio frame.

Manner 1 and Manner 2 are separately used as an example below, to describe optional solutions of determining the locations of the full-duplex subframe and the normal subframe in the radio frame by the terminal device 302.

Manner 1

The terminal device 302 may determine, in the bitmap that, a bit whose value is 1 is a location of a full-duplex subframe and a bit whose value is 0 is a location of a normal subframe.

Manner 2

In Manner 2, the terminal device 302 may use one of the following optional manners when determining the locations of the full-duplex subframe and the normal subframe.

Optional manner 1

If a subframe in one location in the radio frame is an uplink subframe based on some of frame format configurations indicated by a plurality of pieces of second indication information and is a downlink subframe based on other frame format configurations, the terminal device 302 determines that the subframe in the one location is a full-duplex subframe.

Optional manner 2

If a subframe in one location in the radio frame is an uplink subframe based on some of frame format configurations indicated by a plurality of pieces of second indication information and is a special subframe based on other frame format configurations, the terminal device 302 determines that the subframe in the one location is a full-duplex subframe.

Optional manner 3

If a subframe in one location in the radio frame is a downlink subframe based on some of frame format configurations indicated by a plurality of pieces of second indication information and is a special subframe based on other frame format configurations, the terminal device 302 determines that the subframe in the one location is a full-duplex subframe.

For example, if N=2, the plurality of pieces of second indication information are the foregoing SIBSubframeAssignment 0 and SIBSubframeAssignment 1, and the SIBSubframeAssignment 0 is the uplink-downlink configuration 0 and the SIBSubframeAssignment 1 is the uplink-downlink configuration 1, the terminal device 302 determines that the subframe 4 is an uplink subframe based on the SIBSubframeAssignment 0, and determines that the subframe 4 is a downlink subframe based on the SIBSubframeAssignment 1, so that the terminal device 302 determines that the subframe 4 is a full-duplex subframe. Likewise, the terminal device 302 can also determine that the subframe 9 is a full-duplex subframe. Other subframes than the full-duplex subframe are normal subframes.

S403: The terminal device 302 separately performs radio measurement on the full-duplex subframe and the normal subframe based on the determined locations of the full-duplex subframe and the normal subframe in the radio frame.

For the full-duplex subframe, because some terminal devices perform uplink transmission in the full-duplex subframe and other terminal devices perform downlink reception in the full-duplex subframe, compared with a normal subframe in which only uplink transmission or only downlink reception is performed at a same moment, interference levels are not the same.

Referring to FIG. 5, in a cell covered by the network device 301, if one terminal device 302 performs uplink transmission and another terminal device 302 performs downlink reception in a full-duplex subframe, the terminal device 302 performing the uplink transmission interferes with the terminal device 302 performing the downlink reception, and such interference is referred to as "intra-cell uplink-downlink interference (Uplink-Downlink Interference, UDI)".

There is no UDI in a normal subframe.

Therefore, interference levels of the full-duplex subframe and the normal subframe are different. After learning of the locations of the full-duplex subframe and the normal subframe in the radio frame, the terminal device 302 may separately perform radio measurement on the full-duplex subframe and the normal subframe, to separately obtain interference level values of the two types of subframes to achieve an optimal link adaptation effect.

S404: The network device 301 sends second configuration information of a dedicated frame format configuration for the terminal device 302 to the terminal device 302.

A sequence between step S404 and step S401 is not limited, and step S404 may be completed before step S401, or may be completed after step S401, or the two steps are simultaneously completed. For example, the first configuration information and the second configuration information are delivered in a same message.

An optional implementation of sending, by the network device 301, the second configuration information is as follows:

When the terminal device 302 accesses a cell, the network device 301 may send the second configuration information to the terminal device 302 by using dedicated signaling, for example, the foregoing RRC signaling.

The TDD LTE system is still used as an example. Referring to Table 1, the network device 301 may indicate the uplink-downlink configuration to the terminal device 302 by using the RRC signaling, for example, configures the uplink-downlink configuration 0 in Table 1 for one terminal device 302, and sends, to the terminal device 302, second configuration information used for indicating the uplink-downlink configuration 0; and configures the uplink-downlink configuration 1 in Table 1 for another terminal device 302, and sends, to the another terminal device 302, second configuration information used for indicating the uplink-downlink configuration 1.

S405: The terminal device 302 determines, based on the received second configuration information, the frame format configuration to be used by the terminal device 302.

The terminal device 302 receives the second configuration information that is of the dedicated frame format configuration and that is sent by the network device 301, and determines, based on the second configuration information, a dedicated frame format configuration to be used by the terminal device 302.

For example, the TDD LTE system is used as an example. The terminal device 302 may determine, based on the received second configuration information and according to Table 1 stipulated in a protocol, an uplink-downlink configuration to be used by the terminal device 302.

S406: The terminal device 302 determines, based on the determined frame format configuration to be used by the terminal device 302, a HARQ timing configuration to be used by the terminal device 302.

The terminal device 302 may determine, based on a HARQ timing configuration corresponding to the uplink-downlink configuration stipulated in the protocol, a HARQ timing configuration corresponding to the uplink-downlink configuration to be used by the terminal device 302.

S407: The terminal device 302 performs uplink and downlink transmission based on the determined HARQ timing configuration to be used by the terminal device 302.

FIG. 6 is a schematic structural diagram of a terminal device according to an embodiment of the present invention. As shown in FIG. 6, the terminal device includes:

a receiving module 601, configured to receive first configuration information that is of a frame format configuration and that is sent by a network device, where the first configuration information is used for determining, by the terminal device, locations, in a radio frame, of a full-duplex subframe and a normal subframe in the radio frame based on the first configuration information; and a processing module 602, configured to determine the locations, in the radio frame, of the full-duplex subframe and the normal subframe in the radio frame based on the first configuration information, where the full-duplex subframe is a subframe in which the network device can simultaneously perform downlink transmission and uplink reception in the radio frame, and the normal subframe is a subframe in the radio frame other than the full-duplex subframe.

Optionally, the first configuration information includes N pieces of first indication information arranged in sequence, where N is a positive integer and is a quantity of subframes included in one radio frame, and each piece of first indication information corresponds to one subframe in the radio frame and is used for indicating whether the corresponding subframe is the full-duplex subframe or the normal subframe.

The processing module 602 is specifically configured to: separately determine, based on the N pieces of first indication information arranged in sequence, whether the subframe corresponding to each piece of first indication information is the full-duplex subframe or the normal subframe, and determine the locations of the full-duplex subframe and the normal subframe in the radio frame in order of the N pieces of first indication information.

Optionally, the first configuration information includes a plurality of pieces of second indication information, where each piece of second indication information is used for indicating an available frame format configuration in a cell, and different pieces of second indication information are used for indicating different frame format configurations.

The processing module 602 is specifically configured to:

if a subframe in one location in the radio frame is an uplink subframe based on frame format configurations indicated by some of the plurality of pieces of second indication information and is a downlink subframe based on frame format configurations indicated by other pieces of second indication information in the plurality of pieces of second indication information, determine, by the terminal device, that the subframe in the one location is a full-duplex subframe; or if a subframe in one location in the radio frame is an uplink subframe based on frame format configurations indicated by some of the plurality of pieces of second indication information and is a special subframe based on frame format configurations indicated by other pieces of second indication information in the plurality of pieces of second indication information, determine, by the terminal device, that the subframe in the one location is a full-duplex subframe; or if a subframe in one location in the radio frame is a downlink subframe based on frame format configurations indicated by some of the plurality of pieces of second indication information and is a special subframe based on frame format configurations indicated by other pieces of second indication information in the plurality of pieces of second indication information, determine, by the terminal device, that the subframe in the one location is a full-duplex subframe.

Optionally, the processing module 602 is further configured to:

after determining the locations, in the radio frame, of the full-duplex subframe and the normal subframe in the radio frame based on the received first configuration information, separately perform radio measurement on the full-duplex subframe and the normal subframe.

The processing module 602 may perform radio measurement on a radio signal received by the receiving module 601.

Optionally, the receiving module 601 is further configured to: receive, from the network device, second configuration information of a frame format configuration for the terminal device, where second configuration information sent by the network device for different terminal devices is not completely the same; and the processing module 602 is further configured to determine, based on the second configuration information, the frame format configuration to be used by the terminal device.

Optionally, the receiving module 601 is specifically configured to:

receive the first configuration information broadcast by the network device; and receive the second configuration information that is sent by the network device to the terminal device by using dedicated signaling.

For another optional implementation of the terminal device, refer to the foregoing implementation of the terminal device 302. The processing module 602 may be configured to implement a processing function of the terminal device 302, and the receiving module 601 may be configured to implement a receiving function of the terminal device 302.

FIG. 7 is a schematic diagram of an optional hardware implementation of the terminal device shown in FIG. 6. The receiving module 601 may be implemented by using a receiver 701, and the processing module 602 may be implemented by using a processor 702.

The receiver 701 is configured to receive first configuration information that is of a frame format configuration and that is sent by a network device, where the first configuration information is used for determining, by the terminal device, locations, in a radio frame, of a full-duplex subframe and a normal subframe in the radio frame based on the first configuration information; and the processor 702 is configured to determine the locations, in the radio frame, of the full-duplex subframe and the normal subframe in the radio frame based on the first configuration information, where the full-duplex subframe is a subframe in which the network device can simultaneously perform downlink transmission and uplink reception in the radio frame, and the normal subframe is a subframe in the radio frame other than the full-duplex subframe.

For another optional implementation of the receiver 701, refer to the implementation of the receiving module 601. For another optional implementation of the processor 702, refer to the implementation of the processing module 602.

FIG. 8 is a schematic structural diagram of a network device according to an embodiment of the present invention. As shown in FIG. 8, the network device includes:

a processing module 801, configured to determine first configuration information of a frame format configuration, where the first configuration information is used for determining, by a terminal device, locations, in a radio frame, of a full-duplex subframe and a normal subframe in the radio frame; and a sending module 802, configured to send the first configuration information to the terminal device, where the full-duplex subframe is a subframe in which the network device can simultaneously perform downlink transmission and uplink reception in the radio frame, and the normal subframe is a subframe in the radio frame other than the full-duplex subframe.

Optionally, the first configuration information includes:

N pieces of first indication information arranged in sequence, where N is a positive integer and is a quantity of subframes included in one radio frame, and each piece of first indication information corresponds to one subframe in the radio frame and is used for indicating whether the corresponding subframe is the full-duplex subframe or the normal subframe; and a plurality of pieces of second indication information, where each piece of second indication information is used for indicating an available frame format configuration in a cell, and different pieces of second indication information are used for indicating different frame format configurations.

Optionally, the sending module 802 is further configured to:

send second configuration information of the frame format configuration for the terminal device to the terminal device, where second configuration information sent for different terminal devices is not completely the same.

Optionally, the sending module 802 is specifically configured to:

broadcast the first configuration information; and send the second configuration information to the terminal device by using dedicated signaling.

For another optional implementation of the network device, refer to the implementation of the network device 301. The processing module 801 may be configured to implement a processing function of the network device 301, and the sending module 802 may be configured to implement a sending function of the network device 301.

FIG. 9 is a schematic diagram of an optional hardware implementation of the network device shown in FIG. 8. The processing module 801 may be implemented by using a processor 901 in FIG. 9, and the sending module 802 may be implemented by using a transmitter 902 in FIG. 9.

The processor 901 is configured to determine first configuration information of a frame format configuration, where the first configuration information is used for determining, by a terminal device, locations, in a radio frame, of a full-duplex subframe and a normal subframe in the radio frame; and the transmitter 902 is configured to send the first configuration information to the terminal device, where the full-duplex subframe is a subframe in which the network device can simultaneously perform downlink transmission and uplink reception in the radio frame, and the normal subframe is a subframe in the radio frame other than the full-duplex subframe.

For another optional implementation of the processor 901, refer to the implementation of the processing module 801, and for another optional implementation of the transmitter 902, refer to the implementation of the sending module 802.

In this embodiment of the present invention, the terminal device determines the locations of the full-duplex subframe and the normal subframe in the radio frame based on the first configuration information, so that the full-duplex subframe and the normal subframe can be measured independently, and the terminal device can better achieve link adaptation in a same type of subframe.

Further, the second configuration information is sent to the terminal device, to implement a dedicated frame format configuration for the terminal device, so that a frame format configuration manner is more flexible, and a flexible frame format configuration can be implemented with respect to different transmission requirements of the terminal device, thereby improving an overall throughput of the cell.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the protection scope of the present invention defined by the following claims and their equivalent technologies.

In the Claims

Reprint the Claims as shown on the attached pages.

What is claimed is:

1. A communication apparatus, comprising:

a receiver, configured to receive first configuration information that is of a frame format configuration and that is received from a network device, wherein the first configuration information is used for determining locations, in a radio frame, of a full-duplex subframe and a normal subframe in the radio frame based on the first configuration information; and a processor, configured to determine the locations, in the radio frame, of the full-duplex subframe and the normal subframe in the radio frame based on the first configuration information, wherein the full-duplex subframe is a subframe in which the network device can simultaneously perform downlink transmission and uplink reception in the radio frame, and the normal subframe is a subframe in the radio frame other than the full-duplex subframe.

2. The apparatus according to claim 1, wherein the first configuration information comprises N pieces of first indication information arranged in sequence, wherein N is a positive integer and is a quantity of subframes comprised in one radio frame, and each piece of first indication information corresponds to one subframe in the radio frame and is used for indicating whether the corresponding subframe is the full-duplex subframe or the normal subframe; and the processor is specifically configured to: separately determine, based on the N pieces of first indication information arranged in sequence, whether the subframe corresponding to each piece of first indication information is the full-duplex subframe or the normal subframe, and determine the locations of the full-duplex subframe and the normal subframe in the radio frame in order of the N pieces of first indication information.

3. The apparatus according to claim 1, wherein the first configuration information comprises a plurality of pieces of second indication information, wherein each piece of second indication information is used for indicating an available frame format configuration in a cell, and different pieces of second indication information are used for indicating different frame format configurations; and the processor is specifically configured to:

if a subframe in one location in the radio frame is an uplink subframe based on frame format configurations indicated by some of the plurality of pieces of second indication information and is a downlink subframe based on frame format configurations indicated by other pieces of second indication information in the plurality of pieces of second indication information, determine that the subframe in the one location is a full-duplex subframe; or if a subframe in one location in the radio frame is an uplink subframe based on frame format configurations indicated by some of the plurality of pieces of second indication information and is a special subframe based on frame format configurations indicated by other pieces of second indication information in the plurality of pieces of second indication information, determine that the subframe in the one location is a full-duplex subframe; or if a subframe in one location in the radio frame is a downlink subframe based on frame format configurations indicated by some of the plurality of pieces of second indication information and is a special subframe based on frame format configurations indicated by other pieces of second indication information in the plurality of pieces of second indication information, determine, by the terminal device, that the subframe in the one location is a full-duplex subframe.

4. The apparatus according to claim 1, wherein the processor is further configured to:

after determining the locations, in the radio frame, of the full-duplex subframe and the normal subframe in the radio frame based on the received first configuration information, separately perform radio measurement on the full-duplex subframe and the normal subframe.

5. The apparatus according to claim 1, wherein the receiver is further configured to: receive, from the network device, second configuration information of a frame format configuration for the apparatus, wherein second configuration information received from the network device for different apparatuses is not completely the same; and the processor is further configured to determine, based on the second configuration information, the frame format configuration to be used by the apparatus.

6. The apparatus according to claim 5, wherein the receiver is specifically configured to:

receive the first configuration information broadcast by the network device; and receive the second configuration information that is received from the network device to the apparatus by using dedicated signaling.

7. A communication apparatus, comprising:

a processor, configured to determine first configuration information of a frame format configuration, wherein the first configuration information is used for determining, by a terminal device, locations, in a radio frame, of a full-duplex subframe and a normal subframe in the radio frame; and a transmitter, configured to send the first configuration information to the terminal device, wherein the full-duplex subframe is a subframe in which the apparatus can simultaneously perform downlink transmission and uplink reception in the radio frame, and the normal subframe is a subframe in the radio frame other than the full-duplex subframe.

8. The apparatus according to claim 7, wherein the first configuration information comprises:

N pieces of first indication information arranged in sequence, wherein N is a positive integer and is a quantity of subframes comprised in one radio frame, and each piece of first indication information corresponds to one subframe in the radio frame and is used for indicating whether the corresponding subframe is the full-duplex subframe or the normal subframe; and a plurality of pieces of second indication information, wherein each piece of second indication information is used for indicating an available frame format configuration in a cell, and different pieces of second indication information are used for indicating different frame format configurations.

9. The apparatus according to claim 7, wherein the transmitter is further configured to:

send second configuration information of the frame format configuration for the terminal device to the terminal device, wherein second configuration information sent for different terminal devices is not completely the same.

10. The apparatus according to claim 9, wherein the transmitter is specifically configured to: broadcast the first configuration information; and send the second configuration information to the terminal device by using dedicated signaling.

11. A frame format configuration method, comprising:

receiving, by a terminal device, first configuration information that is of a frame format configuration and that is received from a network device, wherein the first configuration information is used for determining, by the terminal device, locations, in a radio frame, of a full-duplex subframe and a normal subframe in the radio frame based on the first configuration information; and determining, by the terminal device, the locations, in the radio frame, of the full-duplex subframe and the normal subframe in the radio frame based on the received first configuration information, wherein the full-duplex subframe is a subframe in which the network device can simultaneously perform downlink transmission and uplink reception in the radio frame, and the normal subframe is a subframe in the radio frame other than the full-duplex subframe.

12. The method according to claim 11, wherein the first configuration information comprises N pieces of first indication information arranged in sequence, wherein N is a positive integer and is a quantity of subframes comprised in one radio frame, and each piece of first indication information corresponds to one subframe in the radio frame and is used for indicating whether the corresponding subframe is the full-duplex subframe or the normal subframe; and the determining, by the terminal device, the locations, in the radio frame, of the full-duplex subframe and the normal subframe in the radio frame based on the received first configuration information comprises:

separately determining, by the terminal device based on the N pieces of first indication information arranged in sequence, whether the subframe corresponding to each piece of first indication information is the full-duplex subframe or the normal subframe, and determining the locations of the full-duplex subframe and the normal subframe in the radio frame in order of the N pieces of first indication information.

13. The method according to claim 11, wherein the first configuration information comprises a plurality of pieces of second indication information, wherein each piece of second indication information is used for indicating an available frame format configuration in a cell, and different pieces of second indication information are used for indicating different frame format configurations; and the determining, by the terminal device, the locations, in the radio frame, of the full-duplex subframe and the normal subframe in the radio frame based on the received first configuration information comprises:

if a subframe in one location in the radio frame is an uplink subframe based on frame format configurations indicated by some of the plurality of pieces of second indication information and is a downlink subframe based on frame format configurations indicated by other pieces of second indication information in the plurality of pieces of second indication information, determining, by the terminal device, that the subframe in the one location is a full-duplex subframe; or if a subframe in one location in the radio frame is an uplink subframe based on frame format configurations indicated by some of the plurality of pieces of second indication information and is a special subframe based on frame format configurations indicated by other pieces of second indication information in the plurality of pieces of second indication information, determining, by the terminal device, that the subframe in the one location is a full-duplex subframe; or if a subframe in one location in the radio frame is a downlink subframe based on frame format configurations indicated by some of the plurality of pieces of second indication information and is a special subframe based on frame format configurations indicated by other pieces of second indication information in the plurality of pieces of second indication information, determining, by the terminal device, that the subframe in the one location is a full-duplex subframe.

14. The method according to claim 11, wherein after the determining, by the terminal device, the locations, in the radio frame, of the full-duplex subframe and the normal subframe in the radio frame based on the received first configuration information, the method further comprises:

separately performing, by the terminal device, radio measurement on the full-duplex subframe and the normal subframe.

15. The method according to claim 11, wherein the method further comprises:

receiving, by the terminal device, second configuration information of the frame format configuration for the terminal device that is received from the network device, wherein second configuration information received from the network device for different terminal devices is not completely the same; and determining, by the terminal device based on the received second configuration information, the frame format configuration to be used by the terminal device.

16. The method according to claim 15, wherein the receiving, by a terminal device, first configuration information that is of a frame format configuration and that is received from a network device comprises: receiving, by the terminal device, the first configuration information broadcast by the network device; and the receiving, by the terminal device, second configuration information of the frame format configuration for the terminal device that is received from the network device comprises: receiving, by the terminal device, the second configuration information that is received from the network device to the terminal device by using dedicated signaling.

17. A frame format configuration method, comprising:

determining, by a network device, first configuration information of a frame format configuration, wherein the first configuration information is used for determining, by a terminal device, locations, in a radio frame, of a full-duplex subframe and a normal subframe in the radio frame; and sending, by the network device, the determined first configuration information to the terminal device, wherein the full-duplex subframe is a subframe in which the network device can simultaneously perform downlink transmission and uplink reception in the radio frame, and the normal subframe is a subframe in the radio frame other than the full-duplex subframe.

18. The method according to claim 17, wherein the first configuration information comprises:

N pieces of first indication information arranged in sequence, wherein N is a positive integer and is a quantity of subframes comprised in one radio frame, and each piece of first indication information corresponds to one subframe in the radio frame and is used for indicating whether the corresponding subframe is the full-duplex subframe or the normal subframe; and a plurality of pieces of second indication information, wherein each piece of second indication information is used for indicating an available frame format configuration in a cell, and different pieces of second indication information are used for indicating different frame format configurations.

19. The method according to claim 17, wherein the method further comprises:

sending, by the network device, second configuration information of the frame format configuration for the terminal device to the terminal device, wherein second configuration information sent by the network device for different terminal devices is not completely the same.

20. The method according to claim 19, wherein the sending, by the network device, the determined first configuration information to the terminal device comprises: broadcasting, by the network device, the first configuration information; and sending, by the network device, second configuration information of the frame format configuration for the terminal device to the terminal device, wherein the network device sends the second configuration information to the terminal device by using dedicated signaling.